(12) United States Patent
Odum et al.

(10) Patent No.: US 12,352,561 B2
(45) Date of Patent: *Jul. 8, 2025

(54) RESILIENT FLOORING PRODUCT AND METHODS OF MAKING SAME

(71) Applicant: COLUMBIA INSURANCE COMPANY, Omaha, NE (US)

(72) Inventors: Tom Odum, Tunnel Hill, GA (US); Jay Vecsey, Canton, GA (US); Jeff Wright, Cartersville, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/953,614

(22) Filed: Nov. 20, 2024

(65) Prior Publication Data
US 2025/0076030 A1    Mar. 6, 2025

Related U.S. Application Data

(63) Continuation of application No. 18/339,499, filed on Jun. 22, 2023, now Pat. No. 12,203,276, which is a continuation of application No. 17/873,874, filed on Jul. 26, 2022, now Pat. No. 11,725,397, which is a continuation of application No. 17/143,932, filed on Jan. 7, 2021, now Pat. No. 11,434,647, which is a continuation of application No. 15/711,278, filed on Sep. 21, 2017, now Pat. No. 10,914,080.

(60) Provisional application No. 62/399,040, filed on Sep. 23, 2016.

(51) Int. Cl.
*B32B 3/10* (2006.01)
*G01B 11/24* (2006.01)
*G06T 17/00* (2006.01)

(52) U.S. Cl.
CPC .............. *G01B 11/24* (2013.01); *G06T 17/00* (2013.01); *G06T 2200/08* (2013.01)

(58) Field of Classification Search
None
See application file for complete search history.

(56) References Cited

U.S. PATENT DOCUMENTS

| | | | |
|---|---|---|---|
| 6,350,496 B1 | 2/2002 | Haftvani et al. |
| 6,568,148 B1 | 5/2003 | Eisermann |
| 6,804,926 B1 | 10/2004 | Eisermann |
| 7,065,935 B2 | 6/2006 | Ralf |
| 7,833,611 B2 | 11/2010 | Phan et al. |

(Continued)

FOREIGN PATENT DOCUMENTS

| | | |
|---|---|---|
| CN | 103958213 | 7/2014 |
| EP | 2402154 | 1/2012 |

(Continued)

OTHER PUBLICATIONS

US 11,413,884, Nov. 2, 2006, Bryant, (withdrawn).

(Continued)

*Primary Examiner* — Christopher M Polley
(74) *Attorney, Agent, or Firm* — Ballard Spahr LLP

(57) ABSTRACT

Described herein are resilient floor coverings produced by using digitally printed UV-cured inks and exhibiting high adhesion properties between an ink layer and a wear layer. Also described herein are methods for manufacturing same. This abstract is intended as a scanning tool for purposes of searching in the particular art and is not intended to be limiting of the present invention.

61 Claims, 5 Drawing Sheets

(56) References Cited

U.S. PATENT DOCUMENTS

| | | |
|---|---|---|
| 7,910,194 B2 | 3/2011 | Bieser et al. |
| 7,918,062 B2 | 4/2011 | Chen |
| 8,316,604 B2 | 11/2012 | Thiers |
| 8,366,854 B2 | 2/2013 | Buhlmann |
| 8,445,060 B2 | 5/2013 | Nasatti |
| 8,465,804 B2 | 6/2013 | Provoost et al. |
| 8,500,230 B2 | 8/2013 | Thiers et al. |
| 8,557,083 B2 | 10/2013 | Paganelli |
| 8,564,207 B2 | 10/2013 | Van Herpen |
| 8,591,786 B2 | 11/2013 | Brouckaert et al. |
| 8,592,501 B2 | 11/2013 | Phan et al. |
| 8,617,690 B2 | 12/2013 | Eisermann |
| 8,641,849 B2 | 2/2014 | Buhlmann |
| 8,850,768 B2 | 10/2014 | Hannig |
| 8,940,124 B2 | 1/2015 | Zierold |
| 8,956,714 B2 | 2/2015 | Vermeulen |
| 9,033,009 B2 | 5/2015 | Peronto et al. |
| 9,132,671 B2 | 9/2015 | Hannig |
| 9,145,681 B2 | 9/2015 | Hannig |
| 9,174,423 B2 | 11/2015 | Buhlmann |
| 9,259,959 B2 | 2/2016 | Clement et al. |
| 9,266,382 B2 | 2/2016 | Schacht et al. |
| 9,315,994 B2 | 4/2016 | Chen |
| 9,321,278 B2 | 4/2016 | Clement et al. |
| 9,359,773 B2 | 6/2016 | Hahn et al. |
| 9,434,206 B2 | 9/2016 | Hoff |
| 9,512,622 B2 | 12/2016 | Hannig |
| 9,522,489 B2 | 12/2016 | Anderson et al. |
| 9,566,823 B2 | 2/2017 | Clement et al. |
| 9,650,483 B2 | 5/2017 | Hannig |
| 9,695,600 B2 | 7/2017 | Vandevoorde |
| 9,770,937 B2 | 9/2017 | Clement |
| 9,828,486 B2 | 11/2017 | Lensbouer |
| 9,840,091 B2 | 12/2017 | Cloots et al. |
| 9,885,188 B2 | 2/2018 | Clement |
| 10,000,040 B2 | 6/2018 | Meirlaen et al. |
| 10,011,702 B2 | 7/2018 | Hannig |
| 10,022,956 B2 | 7/2018 | De Mondt et al. |
| 10,041,259 B2 | 8/2018 | Meersseman et al. |
| 10,047,529 B2 | 8/2018 | Vandevoorde et al. |
| 10,052,818 B2 | 8/2018 | Hannig |
| 10,059,072 B2 | 8/2018 | Hannig |
| 10,112,426 B2 | 10/2018 | Van den Bergen et al. |
| 10,189,300 B2 | 1/2019 | Hannig |
| 10,190,611 B2 | 1/2019 | Hannig |
| 10,214,028 B2 | 2/2019 | Clement et al. |
| 10,239,346 B2 | 3/2019 | Vermeulen |
| 10,308,056 B2 | 6/2019 | De Mondt |
| 10,336,032 B2 | 7/2019 | Hannig |
| 10,350,938 B2 | 7/2019 | Hoff |
| 10,364,014 B2 | 7/2019 | Cinausero et al. |
| 10,465,391 B2 | 11/2019 | Clement |
| 10,472,833 B2 | 11/2019 | Loncke et al. |
| 10,479,134 B2 | 11/2019 | Hannig |
| 10,480,201 B2 | 11/2019 | Segaert |
| 10,532,597 B2 | 1/2020 | Clement |
| 10,549,550 B2 | 2/2020 | Clement et al. |
| 10,556,461 B2 | 2/2020 | Buhlmann |
| 10,618,346 B2 | 4/2020 | Hannig |
| 10,619,357 B2 | 4/2020 | Segaert |
| 10,619,358 B2 | 4/2020 | Segaert |
| 10,807,385 B2 | 4/2020 | Clement et al. |
| 10,829,943 B2 | 4/2020 | Segaert |
| 10,655,338 B2 | 5/2020 | D'Hondt et al. |
| 10,682,806 B2 | 6/2020 | Kackmann-Schneider et al. |
| 10,759,205 B2 | 9/2020 | Forget et al. |
| 10,774,543 B2 | 9/2020 | Segaert et al. |
| 10,814,648 B1 | 10/2020 | Clement et al. |
| 10,814,669 B2 | 10/2020 | Buhlmann |
| 10,815,621 B2 | 10/2020 | Hoff |
| 10,821,714 B2 | 11/2020 | Van Vlassenrode et al. |
| 10,829,942 B2 | 11/2020 | Vandevoorde |
| 10,857,832 B2 | 12/2020 | Hannig |
| 11,174,647 B2 | 1/2021 | Vandevoorde |
| 10,906,348 B2 | 2/2021 | Maertens et al. |
| 10,933,684 B2 | 3/2021 | Bastin et al. |
| 10,940,637 B2 | 3/2021 | Kackmann-Schneider et al. |
| 10,941,579 B2 | 3/2021 | Clement |
| 10,953,686 B2 | 3/2021 | Maesen |
| 10,960,644 B2 | 3/2021 | Peres et al. |
| 10,961,721 B2 | 3/2021 | Van Vlassenrode et al. |
| 10,994,555 B2 | 5/2021 | Clement et al. |
| 11,021,880 B2 | 6/2021 | Hannig |
| 11,059,320 B2 | 7/2021 | Schacht et al. |
| 11,198,318 B2 | 7/2021 | Schacht |
| 11,117,410 B2 | 9/2021 | Clement |
| 11,117,417 B2 | 9/2021 | Hoff |
| 11,236,514 B2 | 2/2022 | Meersseman et al. |
| 11,292,289 B2 | 4/2022 | Vermeulen |
| 11,299,893 B2 | 4/2022 | Segaert et al. |
| 11,338,557 B2 | 5/2022 | Chan |
| 11,400,701 B2 | 8/2022 | De Mondt |
| 11,401,719 B2 | 8/2022 | Clement |
| 11,465,439 B2 | 10/2022 | Clement |
| 11,473,315 B2 | 10/2022 | D'Hondt et al. |
| 11,491,816 B2 | 11/2022 | Schacht et al. |
| 11,492,811 B2 | 11/2022 | Thiers et al. |
| 11,554,577 B2 | 1/2023 | Naeyaert |
| 11,851,891 B2 | 1/2023 | Thiers et al. |
| 11,613,133 B2 | 3/2023 | Clement et al. |
| 11,633,904 B2 | 4/2023 | Wang et al. |
| 11,634,913 B2 | 4/2023 | Meersseman et al. |
| 11,643,823 B2 | 5/2023 | D'Hondt et al. |
| 11,654,712 B2 | 5/2023 | Schacht et al. |
| 11,668,102 B2 | 6/2023 | Loncke et al. |
| 11,701,867 B2 | 7/2023 | Chan |
| 11,739,537 B2 | 8/2023 | D'Hondt et al. |
| 11,739,539 B2 | 8/2023 | D'Hondt et al. |
| 11,746,537 B2 | 9/2023 | D'Hondt et al. |
| 11,781,325 B2 | 10/2023 | Clement |
| 11,781,326 B2 | 10/2023 | Segaert et al. |
| 11,814,851 B2 | 11/2023 | D'Hondt et al. |
| 11,840,850 B2 | 12/2023 | Segaert et al. |
| 11,878,546 B2 | 1/2024 | Cappelle et al. |
| 11,878,548 B2 | 1/2024 | Clement |
| 11,938,751 B2 | 3/2024 | Vermeulen |
| 11,965,343 B2 | 4/2024 | Vandevoorde |
| 11,970,020 B2 | 4/2024 | Vermeulen |
| 11,976,471 B2 | 5/2024 | Meersseman et al. |
| 11,987,044 B2 | 5/2024 | Clement et al. |
| 12,005,731 B2 | 6/2024 | Maesen |
| 12,065,839 B2 | 8/2024 | D 3 Hondt |
| 12,129,664 B2 | 10/2024 | Clement |
| 12,186,973 B2 | 1/2025 | Wang et al. |
| 2003/0161990 A1 | 8/2003 | Higgins et al. |
| 2006/0123731 A1 | 6/2006 | Eisermann |
| 2011/0268933 A1 | 11/2011 | Hahn et al. |
| 2011/0305886 A1 | 12/2011 | Phan et al. |
| 2013/0126066 A1 | 5/2013 | Eisermann |
| 2013/0295346 A1 | 11/2013 | Ferguson |
| 2013/0333821 A1 | 12/2013 | Hahn |
| 2014/0329062 A1 | 11/2014 | Song |
| 2015/0251486 A1 | 9/2015 | Hannig |
| 2015/0258716 A1 | 9/2015 | Hannig |
| 2015/0258845 A1 | 9/2015 | Hannig |
| 2015/0290968 A1 | 10/2015 | Hannig |
| 2016/0340916 A1 | 11/2016 | Wright et al. |
| 2017/0008303 A1 | 1/2017 | Loebel |
| 2017/0144427 A1 | 5/2017 | Klackmann-Schneider et al. |
| 2021/0154990 A1 | 5/2021 | Naeyaert |
| 2021/0229488 A1 | 7/2021 | Schacht et al. |
| 2021/0362528 A1 | 11/2021 | Clement |
| 2022/0034098 A1 | 2/2022 | D'Hondt et al. |
| 2022/0055399 A1 | 2/2022 | Schacht et al. |
| 2023/0191800 A1 | 6/2023 | Clement et al. |
| 2023/0272623 A1 | 8/2023 | Loncke et al. |
| 2023/0295933 A1 | 9/2023 | Meersseman et al. |
| 2023/0349168 A1 | 11/2023 | D'Hondt et al. |
| 2023/0349169 A1 | 11/2023 | D'Hondt et al. |
| 2023/0366213 A1 | 11/2023 | D'Hondt et al. |
| 2023/0374796 A1 | 11/2023 | Segaert |
| 2023/0392389 A1 | 12/2023 | Devos et al. |
| 2023/0417066 A1 | 12/2023 | Meersseman et al. |
| 2023/0417067 A1 | 12/2023 | Segaert et al. |

(56) References Cited

U.S. PATENT DOCUMENTS

| | | |
|---|---|---|
| 2024/0109364 A1 | 4/2024 | Clement |
| 2024/0175272 A1 | 5/2024 | D'Hondt et al. |
| 2024/0191519 A1 | 6/2024 | Vandevoorde |
| 2024/0209638 A1 | 7/2024 | Meersseman et al. |
| 2024/0218673 A1 | 7/2024 | Meersseman et al. |
| 2024/0253389 A1 | 8/2024 | Vermeulen |
| 2024/0368898 A1 | 11/2024 | D'Hondt et al. |
| 2025/0018639 A1 | 1/2025 | Wang et al. |

FOREIGN PATENT DOCUMENTS

| | | |
|---|---|---|
| EP | 2722373 | 4/2014 |
| EP | 2927017 | 10/2015 |
| WO | WO 2011/103641 | 9/2011 |
| WO | WO 2014/029887 | 2/2014 |
| WO | WO 2014/084787 | 6/2014 |
| WO | WO-2016/113378 | 7/2016 |
| WO | WO-2016/134243 | 8/2016 |

OTHER PUBLICATIONS

International Search Report and Written Opinion mailed on Nov. 21, 2017 by the International Searching Authority for Patent Application No. PCT/US2017/052477, which was filed on Sep. 20, 2017 (Inventor—Odum et al.; Applicant—Shaw Industries Group, Inc.; (14 pages).

International Search Report and Written Opinion were mailed on Aug. 19, 2016 by the International Searching Authority for International Application No. PCT/EP2016/060507, filed on May 11, 2016 and published as WO 2016/188743 on Dec. 1, 2016 (Applicant—AGFA NV, et al.)(9 pages).

International Preliminary Report on Patentability was mailed on Nov. 28, 2017 by the International Searching Authority for International Application No. PCT/EP2016/060507, filed on May 11, 2016 and published as WO 2016/188743 on Dec. 1, 2016 (Applicant—AGFA NV, et al.) (7 pages).

RESILIENT FLOORING PRODUCT AND METHODS OF MAKING SAME

CROSS-REFERENCE TO RELATED APPLICATIONS

This is a continuation of U.S. patent application Ser. No. 18/339,499, filed Jun. 22, 2023, which is a continuation of U.S. patent application Ser. No. 17/873,874, filed Jul. 26, 2022, issued as U.S. Pat. No. 11,725,397 on Aug. 15, 2023, which is a continuation of U.S. patent application Ser. No. 17/143,932, filed Jan. 7, 2021, issued as U.S. Pat. No. 11,434,647 on Sep. 6, 2022, which is a continuation of U.S. patent application Ser. No. 15/711,278, filed Sep. 21, 2017, issued as U.S. Pat. No. 10,914,080 on Feb. 9, 2021, which claims the benefit of U.S. Provisional Application No. 62/399,040, filed on Sep. 23, 2016, which are all incorporated herein by reference in their entirety.

FIELD

In one aspect, the invention relates to a resilient floor covering, and more particularly, to resilient floor covering utilizing digitally printed images.

BACKGROUND

Conventional resilient floor coverings are typically produced in the form of a continuous sheet or in the form of a tile or a plank. Resilient sheet flooring typically comprises a bottom, a thermally stable, base or a matte layer coated with one or more layers of similarly formulated polymeric compounds. For aesthetic purposes, an ink layer is also typically disposed between the polymeric layers, and the polymeric layers may optionally be chemically or mechanically embossed. Similarly, resilient tile flooring is typically formed as a composite laminated structure having a base layer, a decorative layer applied on top of the base layer, a protective film layer disposed on top of the decorative layer, and a top coat disposed on top of the protective film layer. For aesthetic purposes, the tile may also be mechanically embossed to impart a desired surface texture or pattern.

Traditionally resilient floor coverings use images printed on films via rotogravure and offset printing methods. One of the major drawbacks in using rotogravure or offset printing methods is the significant capital investments necessary to prepare a rotary printing press, batch and test ink colors, as well as maintain the entire film in a registry. Digital printing, on the other hand, offers a considerably simpler solution by allowing near instant results of images with small run sizes and millions of color variations.

However, use of digital printing introduces additional challenges for the resilient floor coverings manufacturing industry. Specifically, the Ultra Violet (UV) cured inks that are often used in the digital printing to form an ink layer, in fact, do not allow lamination of any additional polymer layers on the top of this ink layer, and thus, prevent formation of a composite laminated structure of the resilient floor coverings.

There remains a need for resilient floor coverings that contain a laminated structure comprising an ink layer formed by digital printing using UV-cured inks, and additional layers adhered on a top of the ink layer. In other words, it would be desirable to provide a resilient floor covering that can be manufactured using digital printing with UV-cured inks, wherein the formed ink layer can be easily adhered to any additional layer, such as, for example, a wear layer overlying the top of the ink layer in a manner allowing the formation of a conventional laminated structure of the resilient floor covering.

There similarly remains a need for a resilient flooring that provides high adhesive properties between an ink and a wear layers. Still further, there is a need for a method of making the same.

SUMMARY

In accordance with the purpose(s) of the invention, as embodied and broadly described herein, the invention, in one aspect, relates to resilient floor coverings having digitally printed ink layers and exhibiting high adhesion properties between the ink layers and wear layers.

In an exemplary aspect, disclosed herein is a resilient floor covering comprising: a backing portion having a first surface and a second surface, wherein the second surface of the backing portion is opposed to the first surface of the backing portion, wherein the backing portion comprises at least one backing layer; a decorative portion having a first surface and a second surface, wherein the second surface of the decorative portion is opposed to the first surface of the decorative portion, wherein the decorative portion overlies the backing portion such that at least a portion of the second surface of the decorative portion contacts at least a portion of the first surface of the backing portion, wherein the decorative portion comprises an ink layer, and wherein the ink layer has a first surface and a second surface, and wherein the second surface of the ink layer is opposed to the first surface of the ink layer, and wherein at least a portion of the first surface of the ink layer defines at least a portion of the first surface of the decorative portion; a tie layer comprising an adhesive composition and having a first surface and a second surface, wherein the second surface of the tie layer is opposed to the first surface of the tie layer, wherein the tie layer substantially overlies the decorative portion such that at least a portion of the second surface of the tie layer contacts and adheres to the first surface of the ink layer; and a wear layer having a first surface and a second surface, wherein the second surface of the wear layer is opposed to the first surface of the wear layer, wherein the wear layer substantially overlies the tie layer such that at least a portion of the second surface of the wear layer contacts and adheres to at least a portion of the first surface of the tie layer.

In another exemplary aspect, disclosed herein is a method for making a resilient floor covering comprising: forming a composite comprising: a backing portion having a first surface and a second surface, wherein the second surface of the backing portion is opposed to the first surface of the backing portion, wherein the backing portion comprises at least one backing layer; a decorative portion having a first surface and a second surface, wherein the second surface of the decorative portion is opposed to the first surface of the decorative portion, wherein the decorative portion overlies the backing portion such that at least a portion of the second surface of the decorative portion contacts at least a portion of the first surface of the backing portion, wherein the decorative portion comprises an ink layer, and wherein the ink layer has a first surface and a second surface, and wherein the second surface of the ink layer is opposed to the first surface of the ink layer, and wherein at least a portion of the first surface of the ink layer defines at least a portion of the first surface of the decorative portion; a tic layer comprising an adhesive composition and having a first surface and a second surface, wherein the second surface of the tie layer is opposed to the first surface of the tie layer, wherein the tie layer substantially overlies the decorative portion such that at least a portion of the second surface of the tie layer contacts and adheres to the first surface of the ink layer; and a wear layer having a first surface and a second surface, wherein the second surface of the wear layer is opposed to the first surface of the wear layer, wherein the wear layer substantially overlies the tie layer such that at least a portion of the second surface of the wear layer contacts and adheres to at least a portion of the first surface of the tie layer.

In another exemplary aspect, further disclosed herein is a method as summarized above wherein the step of forming further comprises: applying the second surface of the decorative portion onto the first surface of the backing portion; applying the second surface of the tie layer onto the first surface of the decorative portion such that the second surface of the tie layer contacts and adheres to the first surface of the ink layer; and applying the second surface of the wear layer onto the first surface of the tie layer such that the second surface of the wear layer contacts and adheres to the first surface of the tie layer.

In yet another exemplary aspect, further disclosed herein is a method as summarized above wherein the step of forming further comprises: applying the second surface of the decorative portion onto the first surface of the backing portion; applying the first surface of the tie layer onto the second surface of the wear layer such that the first surface of the tie layer contacts and adheres to the second surface of the wear layer; and applying the first surface of the decorative portion onto the second surface of the tie layer such that the first surface of the decorative portion contacts and adheres to the second surface of the tie layer.

Additional aspects of the invention will be set forth, in part, in the detailed description, and claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE FIGURES

These and other features of the aspects of the invention described herein will become more apparent in the detailed description in which reference is made to the appended drawings wherein.

DETAILED DESCRIPTION

Figure 1:
FIG. 1 depicts an exemplary structure of a resilient floor covering according to aspects of the present invention.

The present invention can be understood more readily by reference to the following detailed description, examples, drawing, and claims, and their previous and following description. However, before the present articles, devices, systems, and/or methods are disclosed and described, it is to be understood that inventions described and claimed herein are not limited to the specific articles, devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps. Furthermore, it is to be understood that the terms comprise, comprising and comprises as they related to various aspects, elements and features of the disclosed invention also include the more limited aspects of "consisting essentially of" and "consisting of."

As used throughout, the singular forms "a," "an" and "the" include plural referents unless the context clearly dictates otherwise. Thus, for example, reference to "a layer" can include two or more such layers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, the term "substantially" means that the subsequently described event or circumstance completely occurs or that the subsequently described event or circumstance generally, typically, or approximately occurs. For example, when the specification discloses that substantially all of an agent is released, a person skilled in the relevant art would readily understand that the agent need not be completely released. Rather, this term conveys to a person skilled in the relevant art that the agent need only be released to an extent that an effective amount is no longer unreleased.

As used herein, the term "digital printing" refers to a digitally controlled ejection of drops of coloring fluid that is used to position colorants in pre-defined patterns onto a surface.

As used herein, the term "UV cured inks" refers to an ink that after application is at least partially cured by exposure to UV-light. For example, and without limitation, it is understood that UV cured inks can contain photo-initiators, additives, monomer and oligomers. It is further understood that when these inks are exposed to a predetermined UV light power and/or intensity, polymerization of the polymers can occur by both a free radical and a cation curing.

A. Resilient Floor Covering

In various aspects, the present invention relates to resilient floor coverings. In one aspect, the invention relates to a resilient floor covering configured for placement on a floor in a selected orientation. In a further aspect, and with reference to FIG. 1, the resilient floor covering generally comprises a backing portion (102), a decorative portion (104), a tic layer (106), and a wear layer (108).

In one aspect, the resilient floor covering can comprise: a backing portion having a first surface and a second surface, wherein the second surface of the backing portion is opposed to the first surface of the backing portion, and wherein the backing portion comprises at least one backing layer. In some aspects, the backing portion is configured such that the second surface of the backing portion is substantially abutting the floor in a certain orientation. In still further aspects, the backing portion can comprise at least one backing layer.

In further aspects, the resilient floor covering can comprise a decorative portion having a first surface and a second surface, wherein the second surface of the decorative portion is opposed to the first surface of the decorative portion. In certain aspects, the decorative portion overlies the backing portion such that at least a portion of the second surface of the decorative portion contacts at least a portion of the first surface of the backing portion. In still further aspects, the decorative portion comprises an ink layer. In still further aspects, the ink layer has a first surface and a second surface, and wherein the second surface of the ink layer is opposed to the first surface of the ink layer. In still further aspects, at least a portion of the first surface of the ink layer defines at least a portion of the first surface of the decorative portion.

In still further aspects, the resilient floor covering can comprise a tie layer comprising an adhesive composition and having a first surface and a second surface, wherein the second surface of the tie layer is opposed to the first surface of the tie layer. In other aspects, the tie layer substantially overlies the decorative portion such that at least a portion of the second surface of the tie layer contacts and adheres to the first surface of the ink layer.

In some aspects, the resilient floor covering can comprise a wear layer having a first surface and a second surface, wherein the second surface of the wear layer is opposed to the first surface of the wear layer. In other aspects, the wear layer substantially overlies the tie layer such that at least a portion of the second surface of the wear layer contacts and adheres to at least a portion of the first surface of the tie layer. In still further aspects, the first surface of the wear layer can be exposed to an ambient environment. In yet other aspects, the first surface of the wear layer can further comprise a scratch layer. In still further aspects, the scratch layer can have a first surface and a second surface, wherein the second surface of the scratch layer is opposed to the first surface of the scratch layer. In still further aspects, the scratch layer overlies the wear layer such that at least a portion of the second surface of the scratch layer contacts at least a portion of the first surface of the wear layer.

In still further aspects, the resilient floor covering described herein can be in any form known in the art. In certain aspects, the resilient floor covering is a rolled good, sheet good, a tile, or a plank.

1. Backing Portion

In one aspect, the backing portion of the resilient floor covering can have a first surface and a second surface, wherein the second surface is opposed to the first surface. In this aspect, the second surface of the backing portion can be configured abutting the floor when the resilient floor covering is placed in a selected orientation. In another aspect, the backing portion can comprise at least one backing layer. In some aspects, the backing portion can comprise a single backing layer. In yet other aspects, the backing portion can comprise a plurality of backing layers. In certain aspects, when the plurality of backing layers is present, a first backing layer overlies a second backing layer that in its turn overlies a third backing layer, and so on. In certain aspects, it is contemplated that a last backing layer of the plurality of the backing layers can define the second surface of the backing portion. It is further contemplated that a first backing layer of the plurality of backing layers can define the first surface of the backing portion. In still further aspects, the at least one backing layer can comprise a single backing layer. In yet still further aspects, the at least one backing layer can comprise a plurality of backing layers.

In one aspect, the at least one backing layer of the backing portion can comprise one or more first backing layers and a secondary backing layer. For example, in a further aspect, the at least one backing layer of the backing portion can comprise a first backing layer, a second backing layer, and a secondary backing layer. In a still further aspect, the secondary backing layer can define the second surface of the backing portion, and the first and second backing layers can be configured to substantially overlie the secondary backing layer.

Figure 2:
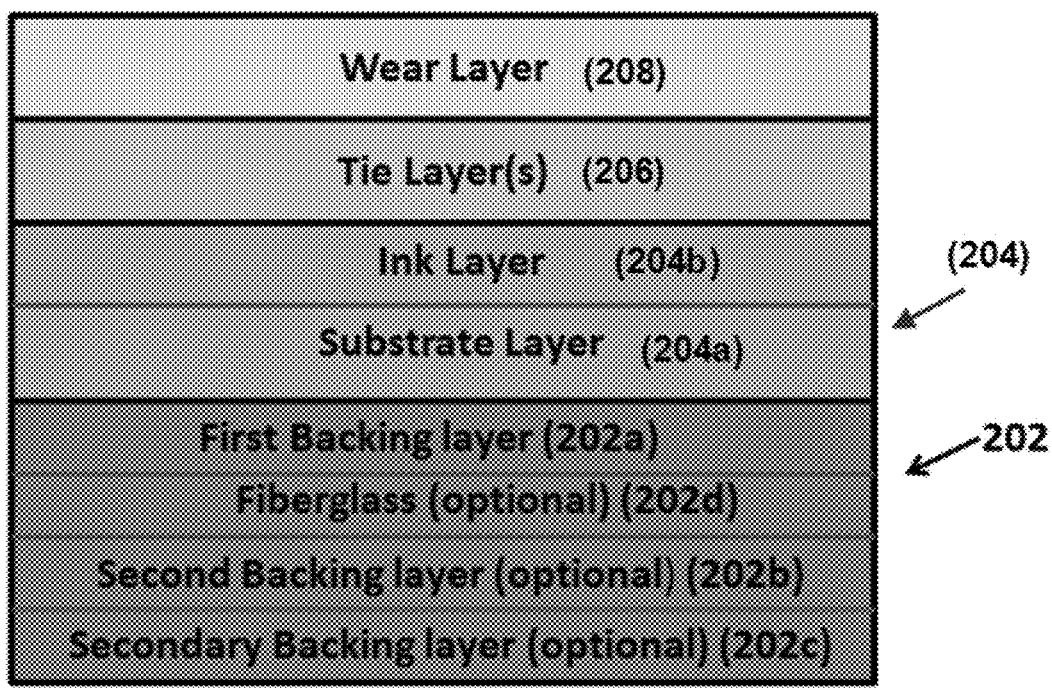
FIG. 2 depicts an exemplary structure of a resilient floor covering according to aspects of the present invention.

In an exemplary aspect, as shown FIG. 2, in addition to wear layer (208), tic layer(s) (206), the decorative portion (204) comprising ink layer (204b) and substrate layer (204a), the one or more backing layers can be formed in the backing portion (202). These one or more backing layers can comprise a first backing layer (202a) and a second backing layer (202b). In this aspect, the first backing layer can define the first surface of the backing portion. In other exemplary aspects, the second backing layer can define the second surface of the backing portion. In yet further exemplary aspects, if the secondary backing layer (202c) is present, the secondary backing layer can define the second surface of the backing potion.

In various further aspects, the one or more backing layers are formed from and comprise a backing composition. In one aspect, the first and second backing layers comprise a backing composition. In some aspects, the first and second backing layers can comprise the same backing composition. In other aspects, the first and second backing layers can comprise different backing compositions.

In certain aspects, the backing portion can comprise additional layers that can be introduced therebetween the first and second backing layers. In some exemplary aspects, and as shown in FIG. 2, the backing portion comprises a reinforcement layer (202d). In still further aspects, the reinforcement layer can comprise a non-woven or wet-laid fiberglass scrims, as well as woven and non-woven thermoplastic fabrics (e.g. polypropylene, nylon and polyester). In still further aspects, the reinforcement layer comprises a fiberglass. Without wishing to be bound by a particular theory, the reinforcement layer can increase dimensional stability by reducing the chance for shrinkage or growth after installation of the flooring product.

In some aspects, the backing composition can comprise any backing composition known in the art. In some aspects, the backing composition can comprise a polyester, a polyamide, a polyvinyl chloride, a polyolefin, a polyurethane, or any combination thereof. It is further understood, that if a combination of various polymers is present in the backing composition, the relative amount of each polymer in the composition can be any amount known in the art.

In some aspects, a "polyester" described herein refers to a category of polymers that contain the ester functional group in their main chain. Polyesters disclosed herein include naturally occurring chemicals, such as in the cutin of plant cuticles, as well as synthetics produced through stepgrowth polymerization. An unlimiting example of polyester components includes any long-chain synthetic polymer composed of at least 85% by weight of an ester of a substituted aromatic carboxylic acid, including but not restricted to substituted terephthalic units, $p(-R-O-CO-C_6H_4-CO-O-)_x$ and parasubstituted hydroxy-benzoate units, $p(-R-O-CO-C_6H_4-O)_x$. In certain examples, the polyester component comprises polyethylene terephthalate (PET) homopolymers and copolymers, polybutylene terephthalate (PBT) homopolymers and copolymers, and the like, including those that contain comonomers such as cyclohexanedimethanol, cyclohexanedicarboxylic acid, and the like.

In other aspects, a "polyamide" as utilized herein, is defined to be any long-chain polymer in which the linking functional groups are amide ($-CO-NH-$) linkages. The term polyamide is further defined to include copolymers, terpolymers and the like as well as homopolymers and also includes blends of two or more polyamides. An example of polyamide component includes one or more of nylon 6, nylon 66, nylon 10, nylon 612, nylon 12, nylon 11, or any combinations thereof.

In yet other aspects, a "polyolefin" disclosed herein, refers to any class of polymers produced from a simple olefin (also called an alkene with the general formula $C_nH_{2n}$) as a monomer. In some aspects, the polyolefins include, but are not limited to, polyethylene, polypropylene, both homopolymer and copolymers, poly(1-butene), poly(3-methyl-1-butene), poly(4-methyl-1-pentene) and the like, as well as combinations or mixtures of two or more of the foregoing.

In still further aspects, a "polyurethane" described herein refers to any class of polymers composed of a chain of organic units joined by carbamate (urethane, $R-O-CO-NR-R$) links.

In one aspect, the backing composition can comprise, for example and without limitation, low-density polyethylene (LDPE), linear low-density polyethylene (LLDPE), ethylene methacrylate (EMA), ethylene vinyl acetate (EVA), polyethylene-polypropylene (PE-PP) rubber, conventional thermoplastic elastomers (TPEs), conventional thermoplastic olefins (TPOs), alpha-olefin polyethylene co-polymers, polyethylene terephthalate (PET), ethylene butyl acrylate (EBA), and the like. In a still further aspect, the backing composition comprises an ethylene-octene copolymer.

In a further aspect, and as disclosed in U.S. patent application Ser. No. 11/963,263, which is incorporated in its entirety by reference herein, the backing composition can comprise substantially linear ethylene polymers and homogeneously branched linear ethylene polymers (i.e., homogenously branched ethylene polymers), which offer low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra low density polyethylene (ULDPE). Exemplary backing layers formed from the disclosed homogeneously branched ethylene polymers are shown in the figures as first or second backing layers.

In still further aspects, the exemplary backing compositions are disclosed in U.S. patent application Ser. No. 15/048,215, which is incorporated in its entirety by reference herein.

In a further aspect, any disclosed herein backing compositions can be used alone or can be blended or mixed with one or more synthetic or natural polymeric materials. For examples, suitable polymers for blending or mixing with homogeneously branched ethylene polymers used in the present invention include, but are not limited to, another homogeneously branched ethylene polymer, low density polyethylene, heterogeneously branched LLDPE, heterogeneously branched ULDPE, medium density polyethylene, high density polyethylene, grafted polyethylene (e.g. a maleic anhydride extrusion grafted heterogeneously branched linear low polyethylene or a maleic anhydride extrusion grafted homogeneously branched ultra-low density polyethylene), ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, and vulcanates.

In a further aspect, the backing composition used to prepare at least one of the backing layers of the present invention can comprise a filler component. As would be recognized by one of ordinary skill in the art, the type of filler used can be selected on the basis of the desired physical properties of the final product. In a still further aspect, exemplary fillers can include, for example and without limitation, calcium carbonate, barium sulfate, barite, glass fiber and powder, metal powder, alumina, hydrated alumina, clay, magnesium carbonate, calcium sulfate, silica or glass, fumed silica, talc, carbon black or graphite, fly ash, cement dust, feldspar, nepheline, magnesium oxide, zinc oxide, aluminum silicate, calcium silicate, titanium dioxide, titanates, wood flour, glass microspheres, chalk, and mixtures thereof. In a yet further aspect, additional fillers that can be used include graphite fiber, silica/glass, wollastonite, crushed glass cullet, kaolin, mica, recycled fines, fiberglass, diatomaceous earth, lime, and mixtures thereof. In an even further aspect, an exemplary filler is fly ash, such as, for example and without limitation, Celceram™ fly ash filler PV20A (a calcium aluminum silicate available from Boral). In a further aspect, the backing composition can comprise post-industrial carpet and/or post-consumer carpet material. In a still further aspect, the backing composition can comprise composites of post-industrial carpet and/or composites of post-consumer carpet. In some aspects, the glass filler is glass fines or crushed glass cullet. In other aspects, the fly ash is coal fly ash.

In a further aspect, the backing composition can comprise a filler in an amount of from about 65% to about 95% by weight, including exemplary filler weight % values of 70% by weight, 71% by weight, 72% by weight, 73% by weight, 74% by weight 75% by weight, 76% by weight, 77% by weight, 78% by weight, 79% by weight, 80% by weight, 85% by weight, 90% by weight, and 94% by weight. In still further aspects, the backing composition can comprise a filler in an amount in a range derived from any two of the above listed exemplary weight percentage values. For example, the backing composition can comprise a filler in a range of from about 70% to about 90% by weight, or from about 75% to about 85% by weight. In one aspect, the backing composition comprises at least 80% filled polyethylene composition. In another aspect, the backing composition comprises at least an 80% filled ethylene-octene copolymer composition.

In a further aspect, the backing composition of the present invention can optionally comprise one or more additives, for example and without limitation, tacifiers, processing agents, foaming agents, plasticizers, or the like. In a still further aspect, the additive can comprise a hydrocarbon resin. In one aspect, the hydrocarbon resin can be PICCOTAC™ 1115, which is manufactured by Eastman Chemical, and which is a relatively high molecular weight, aliphatic C5 resin derived from dienes and other reactive olefin.

In a further aspect, the backing composition can optionally include maleic anhydride grafts wherein maleic anhydride is grafted onto an ethylene polymer at a concentration of about 0.1 to about 5.0 weight percent, preferably about 1 to about 2 weight percent. In a still further aspect, an exemplary composition for forming a maleic anhydride graft is Amplify® GR 204 resin available from Dow Chemicals.

In a further aspect, the secondary backing layer, when present, can comprise, for example and without limitation, oriented polypropylene (OPP), woven polyethylene (PE), nonwoven polyethylene (PE), woven polypropylene (PP), nonwoven polypropylene (PP), woven polyethylene terephthalate (PET), nonwoven polyethylene terephthalate (PET), woven nylon, nonwoven nylon, and the like. In a still further aspect, the secondary backing layer can comprise nonwoven fiberglass, woven fiberglass, recycled fiber shoddy, polyethylene terephthalate (PET) film, polypropylene (PP) film, polyethylene (PE) film, linear low-density polyethylene (LLDPE) film, polystyrene copolymer, polypropylene-polyethylene (PP-PE) copolymer, polyolefin elastomer, polyvinyl chloride, or polyurethane, or a combination thereof. In a still further aspect, the secondary backing layer comprises an embossed pattern.

In a further aspect, the fiberglass layer, when present, can comprise a fiberglass mat. In a still further aspect, the fiberglass layer can comprise a weight of from about 20 to about 90 g/m$^2$, including exemplary values of about 30, 40, 50, 60, 70, or 80 g/m$^2$. In some aspects, the fiberglass mat can allow for increased binder polymer saturation and, thus, a reduction in the chance for delamination from highly filled first and second backing layers. In a further aspect, beneficially, a thinner fiberglass mat can reduce the overall weight of the final flooring product and is less expensive than thicker fiberglass.

2. Decorative Portion

According to aspects of the invention, the resilient floor covering comprises a decorative portion. In certain aspects, the decorative portion has a first surface and a second surface. In yet other aspects, the second surface of the decorative portion is opposed to the first surface of the decorative portion. In certain aspects, the decorative portion can be substantially adjacent to the backing portion such that the first surface of the backing portion contacts the second surface of the decorative portion.

In certain aspects, the decorative portion can comprise an ink layer. In still further aspects, the ink layer has a first surface and a second surface, and wherein the second surface of the ink layer is opposed to the first surface of the ink layer. In still further aspects, at least a portion of the first surface of the ink layer defines at least a portion of the first surface of the decorative portion. Optionally, the ink layer can also define the second surface of the decorative portion.

In yet other aspects, the decorative layer can further comprise a substrate layer. In certain aspects, the substrate layer has a first surface and a second surface, wherein the second surface of the substrate layer is opposed to the first surface of the substrate layer. In still further aspects, the ink layer can be applied to the first surface of the substrate layer. Optionally, the ink layer can be applied to the second surface of the substrate layer. In certain aspects, the second surface of the substrate layer can define the second surface of the decorative portion overlying the first surface of the backing layer. Yet in other aspects, the first surface of the substrate layer can define the second surface of the decorative portion overlying the first surface of the backing layer.

In certain aspects, it is contemplated that the ink layer can be applied either directly or indirectly thereto the first surface of the substrate layer. In a further aspect, the ink layer can comprise any conventional ink, dye, pigment, or other marking substance that can be applied within the resilient floor covering in a desired pattern. For example and without limitation, the ink layer can comprise water-based, soy-based, a UV-cured inks, and/or solvent-based pigments. In still further aspect, the ink layer is a UV cured ink.

It is understood that UV-cured inks can comprise photo-initiators, pigments, additives, monomers and oligomers of various polymers, and the like. In some exemplary aspects, the UV-cured inks can comprise, without limitation, (5-ethyl-1,3-dioxan-5yl)methyl acrylate, 2-phenoxyethyl acrylate; 1-vinylhexahydro-2H-azepin-2-one, substituted phosphine oxide, thrimethylolpropane triacrylate, phenyl bis (2,4 6-trimethylbenzoyl) phosphine oxide, epoxy acrylate oligomer, diacrylate monomer, multi-functional monomers, amine modified acrylate oligomer, 1-vinylhexahydro-2H-asepin-2-one, diacrylate oligomers, benzophenone, triacrylate monomers, 1-hydroxy-cyclohexylphenyl-ketone, 2 hydroxy-2-methylpropiophenone, and the like.

In a further aspect, the ink layer can be applied to the substrate layer by any conventional printing means, which can include, without limitation, rotogravure printing, flexography printing, lithography printing, offset-lithography printing, relief printing, thermography printing, thermal sublimation printing, dye-sublimation printing, heat-transfer printing, digital printing, and the like.

In still further aspects, the ink layer applied by a digital printing. In an exemplary aspect, the ink layer can comprise inks and pigments manufactured by Collins Inks, INX Inks, Durst, HP, EFI, Sun Chemical, or Tiger. In yet other aspects, the ink layer can be digitally printed utilizing digital printers manufactured by Cefla, Durst, Hymmen, EFI, Barbaran or Inca.

In certain aspects, the formed ink layer can be a continuous layer that covers substantially all of the first surface of the substrate. In yet other aspects, the formed ink layer can be a discontinuous layer that covers only a portion of the first surface of the substrate. In yet other aspects, the ink layer can have any desired aesthetic appearance, such as, for example and without limitation, the appearance of simulated hardwood or ceramic flooring.

In certain aspects, the substrate layer can comprise at least one of polyvinyl chloride (PVC), whitened PVC, opaque PVC, oriented polypropylene (OPP), polyolefin (PO), woven polyethylene (PE), nonwoven PE, woven polypropylene (PP), nonwoven PP, woven PET, nonwoven PET, woven nylon, nonwoven nylon, conventional papers, conventional foils, or foiled oriented polypropylene.

In some aspects, the substrate layer comprises a transparent PVC. In yet other aspects, the substrate layer comprises a whitened PVC. In still further aspects, the substrate layer comprises an opaque PVC. It is understood that if whitened substrate is used, any whitening agent known in the art can be utilized. It is further understood that the whitening agent disclosed herein can comprise inorganic and/or organic compounds. In yet other aspects, the whitening agent can be a fluorescent whitening agent. In some exemplary aspects, the whitening chemistry comprises titanium dioxide, zinc dioxide, and the like. In some other aspects, the whitening can be also achieved by cavitation.

In further aspects, the substrate layer can comprise one or more of a heat stabilized biaxially-oriented PET (BoPET), amorphous PET (aPET), recycled PET (rPET), polyethylene terephthlate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPS), polycarbonate, polyethylene (PE), or a copolymer thereof.

In certain aspects, the substrate layer has a thickness from about 1 mil to about 20 mil, including exemplary values of about 2 mil, about 3 mil, about 4 mil, about 5 mil, about 6 mil, about 7 mil, about 8 mil, about 9 mil, about 10 mil, about 11 mil, about 12 mil, about 13 mil, about 14 mil, about 15 mil, about 16 mil, about 17 mil, about 18 mil, and about 19 mil. In still further aspects, the substrate layer can have any thickness in a range derived from any two of the above listed exemplary values. For example, the substrate layer can comprise a thickness in a range of from about 1 mil to about 5 mil, or from about 3 mil to about 7 mil. In still further aspects, the substrate layer can be a film.

3. Tie Layer

According to various further aspects of the invention, the resilient floor covering further comprises a tie layer. In certain aspects, the tie layer comprises at least one tic layer. In yet other aspects, the tie layer can comprise a plurality of tie layers. In still further aspects, the tie layer comprises an adhesive composition. In other aspects, the tie layer has a first surface and a second surface. In still further aspects, the second surface of the tie layer is opposed to the first surface of the tie layer. In yet other aspects, the tic layer can substantially overly the decorative portion such that at least a portion of the second surface of the tie layer contacts and adheres to the first surface of the ink layer.

It is understood that in certain aspects the tie layer can be positioned between opposing layers of the resilient floor covering to enhance or facilitate a bond between otherwise dissimilar or incompatible materials that form the otherwise opposing layers of the floor covering together. As one skilled in the art will appreciate, such dissimilar materials can have inherent properties that negatively affect the ability of the respective materials to bond or otherwise adhere to each other.

In some aspects, the tie layer comprises at least one of conventional acrylic adhesive, ethylene-vinyl acetate (EVA), ethylene-acrylic acid (EAA), ethylene-acrylic acid-maleic anhydride (EAA-MAH), ethylene-methyl acrylate-maleic anhydride (EMA-MAH), ethylene-vinyl acetate-maleic anhydride (EVA-MAH), low density-polyethylene-maleic anhydride (LDPE-MAH), high density polyethylene-maleic anhydride (HDPE-MAH), polyurethane (PUR), polyurethane dispersions (PUD), a UV-curable adhesive, or a combination thereof. In some aspects, the polyurethane dispersions can comprise isocyanate terminated urethane polymer, methylenebis(phenylisocyanate), methylene bisphenyl isocyanate, and the like. The polyurethane dispersion can further comprise oxazolidine hardeners and various modifiers.

In some aspects, the UV-curable adhesives can comprise polyurethane acrylate-based main-chain polymers, polyisoprene acrylate-based main chain polymers, polybutadiene acrylate-based main-chain polymers, monomeric (meth) acrylates, and the like. In certain aspects, the UV-curable adhesives can comprise any adhesives known in the art that are capable of being cured upon exposure to a UV light. In other aspects, the UV-curable adhesive can further comprise other additives such as, for example, and without limitation photo-polymerization initiators, additives that increase flexibility of the resin, and the like.

In still further aspects, the tie layer comprises ethylene-vinyl acetate (EVA). In yet other aspects, the tie layer comprises ethylene-acrylic acid (EAA). In still further aspects, the tie layer comprises polyurethane dispersions (PUD).

In certain aspects, and without wishing to be bound by any theory, the adhesive compositions of the tie layer described herein demonstrate improved adhesion properties when the tie layer is attached to a UV-cured inks. Even further, when the wear layer described herein is further adhered to the tie layer overlying the ink layer, strong adhesion is achieved between all three disclosed layers. In yet other aspects, the tie layer is first adhered to the wear layer and then adhered to the ink layer. In some aspects, the tie layers described herein are capable of overcoming common drawbacks of the UV-cured inks that do not allow lamination of any additional polymer layers on the top of this ink layer. As illustrated in the performance properties described below, the wear layer laminated to the ink layer manufactured with UV-cured inks, when the tie layer is disposed therebetween, exhibits high pull and adhesion values.

In certain aspects, the tie layer has a thickness of about 0.1 mil to about 5 mil, including exemplary values of about 0.5 mil, about 1 mil, about 1.5 mil, about 2 mil, about 2.5 mil, about 3 mil, about 3.5 mil, about 4 mil, and about 4.5 mil. In still further aspects, the tie layer can have any thickness in a range derived from any two of the above listed exemplary values. For example, the tic layer can comprise a thickness in a range of from about 0.5 mil to about 4 mil, or from about 0.1 mil to about 3 mil.

In yet other aspects, the tie layer has a weight of about 1 $g/ft^2$ to about 15 $g/ft^2$, including exemplary values of about 2 $g/ft^2$, about 3 $g/ft^2$, about 4 $g/ft^2$, about 5 $g/ft^2$, about 6 $g/ft^2$, about 7 $g/ft^2$, about 8 $g/ft^2$, about 9 $g/ft^2$, about 10 $g/ft^2$, about 11 $g/ft^2$, about 12 $g/ft^2$, about 13 $g/ft^2$, and about 14 $g/ft^2$. In still further aspects, the tie layer can have any weight that falls in a range derived from any two of the above listed exemplary values. For example, the tie layer can have a weight in a range of from about 2 g/ft² to about 12 g/ft², or from about 4 g/ft² to about 15 g/ft².

In a further aspect, at least one tie layer can comprise Entira™ modifiers and additives, such as, for example and without limitation, Entira™ Coat 100 modifier and additive manufactured by E.I. du Pont de Nemours and Company, Inc. In a still further aspect, the at least one tie layer can comprise water borne coating primers, including, for example and without limitation, G-680 Primer manufactured by Mica Corporation. In a yet further aspect, one or more of the opposing layers are pretreated with at least one of: corona, plasma, ion flame, alcohol, ozone, UV, or primer coating prior to positioning the one or more tie layer.

4. Wear Layer

According to various aspects of the invention, the resilient floor covering comprises a wear layer. In certain aspects, the wear layer has a first surface and a second surface. In still further aspects, the second surface of the wear layer is opposed to the first surface of the wear layer. In still further aspects, the wear layer substantially overlies the tie layer such that at least a portion of the second surface of the wear layer contacts and adheres to at least a portion of the first surface of the tie layer.

In certain aspects, the first surface of the wear layer can be configured for exposure to an ambient environment.

In yet other aspects, the wear layer can be heat laminated to the decorative layer with using a tie layer as an adhesive.

In one aspect, the wear layer can comprise, for example and without limitation, conventional ionomers, polyethylene terephthalate (PET), polyurethane, polypropylene, polytrimethylene terephthalate (PTT), nylon 6, nylon 6,6, polyvinyl chloride (PVC), and the like. In a further aspect, the wear layer can comprise surlyn resin, such as, for example and without limitation, Surlyn® 1706 resin, manufactured by E.I. du Pont de Nemours and Company, Inc. In a still further aspect, the wear layer can comprise heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPE), polycarbonate, polyethylene (PE), high density polyethylene (HDPE), low density polyethylene (LDPE), or a copolymer thereof.

In some aspects, the wear layer is substantially transparent. In other aspects, the wear layer is substantially opaque.

In a yet further aspect, the wear layer can have a thickness in the range of from about 4 mil to about 30 mil, including exemplary thickness ranges of from about 4 to about 8 mil, about 9 to about 14 mil, or about 16 to about 30 mil. In a still further aspect, the thickness can be in a range derived from any of the above listed exemplary values. For example, the thickness can in the range of about 4 mil to about 9 mil, or from 4 mil to about 16 mil. In another aspect, the wear layer can be embossed with a desired texture pattern.

It is contemplated that the invention allows overcoming known drawbacks of the wear layer adhesion to the ink layer. Specifically, the wear layer of the current invention is demonstrated to be strongly adhered to the ink layer by use of the tie layer. Without being bound by any theory, it is contemplated that the tie layer of the present invention improves a compatibility of the two incompatible layers: the ink layer and the wear layer. In the aspects of the present invention the tie layer allows to bond otherwise dissimilar materials that form the otherwise opposing layers of the floor covering together.

In various aspects, the first surface of the wear layer can further comprise a scratch layer. In one aspect, the scratch layer can comprise polyurethane, or acrylate, or a combination thereof. In a further aspect, the scratch layer can comprise a mixture of reactive monomers and oligomers. In a still further aspect, the scratch layer can comprise functionalized monomers, for example, and without limitation, difunctional and multifunctional monomers. In an even further aspect, the scratch layer can comprise at least one photoinitiator, or other component to catalyze a reaction among materials present in the scratch layer. In some aspects, the scratch layer comprises a blend of epoxy acrylate oligomers with difunctional and multifunctional monomers. In still further aspects, the scratch layer is UV-cured scratch layer.

In a further aspect, the scratch layer comprises a surface hardening agent. In a still further aspect, the surface hardening agent can comprises aluminate, alumina, acrylic beads, silica, glass spheres, sol gel alumina, nylon Orgasol, MF silica Optbeads, polyethylene dispersion, silyl acrylic set wet particles, wollastonite, clay, silyl acrylic polysiloxane, sodium silicate, polyvinylidene difluoride (PVDF), silicon carbide, quartz, diamond dust, or a combination thereof. In some aspects, the surface hardening agent is alumina, silica, or a combination thereof.

In a further aspect, the scratch layer has a thickness in the range of from about 0.25 to about 3 mils, including exemplary ranges of from about 0.50 to about 1.25 mils, and 0.50 to about 2.25 mils. In a still further aspect, the surface hardening agent is present in an amount in the range of from about 0.25 weight % to about 15 weight % based upon the total weight of the scratch layer, including exemplary ranges of from about 2 weight % to about 3 weight %, and about 2 weight % to about 10 weight % based upon the total weight of the scratch layer. In some aspects, the surface hardening agent is present in an amount less than or equal to 10 weight %, for example, less than about 9, 8, 7, 6, 5, 4, 3, 2, or 1 weight % based upon the total weight of the scratch layer. In a further aspect, the surface hardening agent comprises particulate material having an average particle size less than or equal to 20 microns, for example, less than or equal to about 15, 10, 9, 8, 7, 6, 5, 4, 3, 2, or 1 micron. In some aspects, the scratch layer is adhered to an underlying wear layer portion by a primer coating layer. In a further aspect, the primer coating layer has a thickness in the range of from about 0.25 to about 1 mil, for example, from about 0.40 to about 0.6 mil.

5. Balancing Layer

According to various further aspects of the invention, the resilient floor covering can optionally comprise at least one balancing layer. In one aspect, the at least one balancing layer can be positioned between opposing layers of the resilient floor covering to provide support, for example, to the backing portion. In another aspect, the at least one balancing layer can be positioned on bottom surface of the flooring product.

In a further aspect, the at least one balancing layer can comprise oriented polypropylene (OPP), woven polyethylene (PE), nonwoven polyethylene (PE), woven polypropylene (PP), nonwoven polypropylene (PP), woven polyethylene terephthalate (PET), nonwoven polyethylene terephthalate (PET), woven nylon, nonwoven nylon, nonwoven fiberglass, woven fiberglass, recycled fiber shoddy, or a combination thereof.

6. Properties of Resilient Floor Coverings

According to various aspects of the disclosure, the resilient floor coverings of the present invention exhibit improved physical and mechanical properties.

In one aspect, the wear layer can exhibits a pull value greater than about 3 pounds, greater than about 3.5 pounds, greater than about 4 pounds, greater than about 4.5 pounds, greater than about 5 pounds, greater than about 5.5 pounds, greater than about 6 pounds, greater than about 6.5 pounds, or greater than about 7 pounds as determined by ASTM 3936 with 1" by 6" strip pulled at a rate of 2"/min for a pull distance of 2.

In one aspect, the wear layer exhibits an abrasion resistance greater than 5,000 cycles when measured according to ASTM D3884 under testing conditions comprising an H18 wheel, 1,000 gram load, and clean each 300 cycles, including exemplary abrasion resistances of greater than 5,000 cycles, greater than 10,000 cycles, or greater than 20,000 cycles when measured according to ASTM D3884 under testing conditions comprising an H18 wheel, 1,000 gram load, and clean each 300 cycles.

In one aspect, the scratch layer in combination with the wear layer exhibits an abrasion resistance greater than 5,000 cycles when measured according to ASTM D3884 under testing conditions comprising an H18 wheel, 1,000 gram load, and clean each 300 cycles, including exemplary abrasion resistances of greater than 5,000 cycles, greater than 10,000 cycles, or greater than 20,000 cycles when measured according to ASTM D3884 under testing conditions comprising an H18 wheel, 1,000 gram load, and clean each 300 cycles.

In one aspect, the scratch layer exhibits an abrasion resistance in the range of from about 100 cycles to about 500 cycles when measured according to ASTM D3884 under testing conditions comprising an H18 wheel, 1,000 gram load, and clean each 300 cycles, including exemplary abrasion resistances ranges of from about 100 cycles to about 400 cycles, or from about 200 cycles to about 300 cycles when measured according to ASTM D3884 under testing conditions comprising an H18 wheel, 1,000 gram load, and clean each 300 cycles.

In one aspect, the exposed first surface of the wear layer exhibits a micro-scratch resistance characterized by of a gloss change rating in the range of 1 to 3 when measured pursuant to Martindale Test EN 16094-2012 Test A (MSR-A) or Test B (MSR-B) visual assessment of surface scratching.

In one aspect, the scratch layer exhibits a heat stability of less than about 12 average Delta E's as determined by ASTM F1514 or ASTM F1515, for example, less than about 8 average Delta E's as determined by ASTM F1514 or ASTM F1515.

In one aspect, the scratch layer exhibits a coating adhesion value in the range of from 4B to 5B as measured according to ASTM-D3359-02 Type B. In a further aspect, the scratch layer exhibits a gloss level in the range of from 5 to 50 as measured with a BYK Gardner Micro-Gloss 60 degree instrument. In a still further aspect, the scratch layer exhibits a gloss level in the range of from 6 to 30 as measured with a BYK Gardner Micro-Gloss 60 degree instrument.

In a further aspect, the scratch layer exhibits a micro-scratch resistance characterized by a gloss change rating in the range of 1 to 3 when measured pursuant to Martindale Test EN 16094-2012 Test A (MSR-A). In a still further aspect, the scratch layer exhibits a micro-scratch resistance characterized by of a gloss change rating in the range of 1 to 3 when measured pursuant to Martindale Test EN 16094-2012 Test B (MSR-B).

In one aspect, the disclosed resilient floor coverings exhibit a static load limit indentation depth in the range of from about 0 inches to about 0.09 inches as measured pursuant to ASTM F970 under conditions of: 250 lb. static load for 24 hours, recover of 24 hours, and 1.125 inch outside diameter probe, including exemplary static load limit indentation depth ranges of from about 0 inches to about 0.07 inches, or from about 0 inches to about 0.05 inches as measured pursuant to ASTM F970 under conditions of: 250 lb. static load for 24 hours, recover of 24 hours, and 1.125 inch outside diameter probe.

In one aspect, the disclosed resilient floor coverings exhibit a short term residual indentation depth in the range of from 0 inches to 0.09 inches as measured pursuant to ASTM F1914 under conditions of: 140 lb. load for 10 minutes, recover of 60 minutes, including exemplary short term residual indentation depth ranges of from about 0 inches to about 0.07 inches, or from about 0 inches to about 0.05 inches as measured pursuant to ASTM F1914 under conditions of: 140 lb. load for 10 minutes, recover of 60 minutes.

In one aspect, the disclosed resilient floor coverings exhibit a critical radiant flux of a class 2 flame spread as measured pursuant to ASTM-E648. In a further aspect, the disclosed resilient floor coverings can exhibit a critical radiant flux of a class 1 flame spread as measured pursuant to ASTM-E648.

In one aspect, the disclosed resilient floor coverings exhibit a dimensional stability variation of less than about 0.17% as determined by ASTM F2199-0 at 82° C. and 24 hr, including dimensional stability values of less than about 0.15% or less than about 0.10% as determined by ASTM F2199-0 at 82° C. and 24 hr. In a further aspect, the disclosed resilient floor coverings can exhibit a dimensional stability characterized by an amount of doming or curling in the range of from 0 to no more than ³⁄₃₂" of an inch when subjected to test conditions of ASTM F2199-0 at 82° C. and after 24 hr. In a still further aspect, the dimensional stability is characterized by an amount of doming or curling of less than about ³⁄₃₂" of an inch when subjected to test conditions of ASTM F2199-0 at 82° C. and after 24 hr, for example, less than about ¹⁄₁₆" of an inch when subjected to test conditions of ASTM F2199-0 at 82° C. and after 24 hr.

B. Methods of Making

In various aspects, the present disclosure also provides methods of making the resilient floor coverings described herein. In one aspect, a method of making the resilient floor coverings described herein can comprise forming a composite comprising: a backing portion having a first surface and a second surface, wherein the second surface of the backing portion is opposed to the first surface of the backing portion, wherein the backing portion comprises at least one backing layer, a decorative portion having a first surface and a second surface, wherein the second surface of the decorative portion is opposed to the first surface of the decorative portion, wherein the decorative portion overlies the backing portion such that at least a portion of the second surface of the decorative portion contacts at least a portion of the first surface of the backing portion, wherein the decorative portion comprises an ink layer, and wherein the ink layer has a first surface and a second surface, and wherein the second surface of the ink layer is opposed to the first surface of the ink layer, and wherein at least a portion of the first surface of the ink layer defines at least a portion of the first surface of the decorative portion; a tie layer comprising an adhesive composition and having a first surface and a second surface, wherein the second surface of the tie layer is opposed to the first surface of the tie layer, wherein the tie layer substantially overlies the decorative portion such that at least a portion of the second surface of the tie layer contacts and adheres to the first surface of the ink layer; and a wear layer having a first surface and a second surface, wherein the second surface of the wear layer is opposed to the first surface of the wear layer, wherein the wear layer substantially overlies the tie layer such that at least a portion of the second surface of the wear layer contacts and adheres to at least a portion of the first surface of the tie layer.

In yet another aspect, a method of making the resilient floor coverings described herein can comprise forming a composite, which parts and components are described herein.

In another aspect, the method of making the resilient floor coverings described herein can comprise applying the second surface of the decorative portion onto the first surface of the backing portion. In a further aspect, the method of making the resilient floor coverings described herein can comprise applying the second surface of the tie layer as described herein onto the first surface of the decorative portion such that the second surface of the tie layer contacts and adheres to the first surface of the ink layer. In a still further aspect, the method of making the resilient floor coverings described herein can comprise applying the second surface of the wear layer onto the first surface of the tie layer such that the second surface of the wear layer contacts and adheres to the first surface of the tie layer.

In yet alternative aspects, the method of making the resilient floor coverings described herein can comprise applying a first surface of the tie layer as described herein on the second surface of the wear layer such that the first surface of the tie layer contacts and adheres to the second surface of the wear layer. In a still further aspect, the method of making the resilient floor coverings described herein can comprise applying the first surface of the decorative portion on the second surface of the tie layer such that the first surface of the decorative portion contacts and adheres to the second surface of the tie layer. It is further understood that in the aspects, wherein the first surface of the ink layer defines the first surface of the decorative portion, the first surface of the ink layer adheres to the second surface of the tie layer.

It is further understood that in some aspects, the method of making the resilient floor coverings described herein can comprise first applying a first surface of the tie layer as described herein on the second surface of the wear layer such that the first surface of the tic layer contacts and adheres to the second surface of the wear layer. Then, the first surface of the decorative portion can be applied on the second surface of the tie layer such that the first surface of the decorative portion contacts and adheres to the second surface of the tie layer. It is further understood that in the aspects, wherein the first surface of the ink layer defines the first surface of the decorative portion, the first surface of the ink layer adheres to the second surface of the tie layer. And then, the backing portion is applied to the decorative portion.

In some aspects, the method of making the resilient floor coverings described herein can further comprise applying an additional tie layer thereto the top surface of the backing portion. In this aspect, the method of making the resilient floor coverings described herein can further comprise applying the decorative portion thereto the additional tie layer applied to the backing portion. It is contemplated that the second surface of the decorative portion can be substantially directly applied to the first surface of the backing portion or the additional tie layer applied thereto the backing portion. It is also contemplated that the second surface of the decorative portion can be applied to the first surface of the backing portion, or the additional tie layer applied thereto the backing portion, using a chemical adhesive, mechanical connection, or other application means. It is further understood that any additional tie layers used to bond or connect various portions of the described resilient floor coverings can be the same or different as the tie layer used to bond the wear layer and the ink layer as described herein.

In some other aspects, the method of making the resilient floor coverings described herein can comprise a step of applying the second surface of the decorative portion onto the first surface of the backing portion comprising: printing a digital image on a substrate layer to form the ink layer, wherein the substrate layer is present in the decorative portion and wherein the substrate layer has a first surface and a second surface, wherein the second surface of the substrate layer is opposed to the first surface of the substrate layer, wherein the ink layer is formed on the first surface of the substrate, and wherein the second surface of the substrate layer is the second surface of the decorative portion.

In still further aspects, the method of making the resilient floor coverings described herein can comprise first a step of printing a digital image on a substrate layer to form the ink layer, wherein the substrate layer is present in the decorative portion and wherein the substrate layer has a first surface and a second surface, wherein the second surface of the substrate layer is opposed to the first surface of the substrate layer, wherein the ink layer is formed on the first surface of the substrate, and wherein the second surface of the substrate layer is the second surface of the decorative portion, and then applying the second surface of the decorative portion onto the first surface of the backing portion.

In a further aspect, the method of making the resilient floor coverings described herein can comprise applying the tie layer thereto the first surface of the decorative portion. As described herein, in some aspects, the first surface of the decorative portion can be defined by the ink layer. It is understood that the tie layer used herein can comprise one or more tie layers that are applied thereto the first surface of the decorative portion.

In a yet further aspect, the method of making the resilient floor coverings described herein can comprise applying the wear layer thereto the first surface of the tie layer that is applied to the first surface of the decorative portion. In some aspects, the first surface of the wear layer can be exposed to an ambient environment. In a further aspect, the method of making the resilient floor coverings described herein can further comprise applying a scratch layer to the first surface of the wear layer.

It is further understood that in alternative aspects, the first surface of tie layer is first applied thereto the second surface of the wear layer. In certain aspects, the wear layer comprises the scratch layer. In yet other aspects, the wear layer does not comprise the scratch layer. It is understood that the tie layer used herein can comprise one or more tie layers that are applied thereto the second surface of the wear layer.

Further, the decorative portion alone or combined with the backing portion can be applied thereto the second surface of the tic layer.

It is understood that digitally printed inks can comprise any UV-curable inks known in the art and described herein. It is further understood that after digitally printing the image onto the substrate, the inks are UV-cured. In some aspects, the curing process comprises one step. This type of curing process is known in the industry as an A-stage curing. In yet other aspects the curing process comprises a number of steps. In certain aspects, the curing process can comprise a first step and a second step. This type of curing process is known in the industry as a B-stage curing. In some aspects, the first step of the curing process is applied to the ink layer printed on the substrate at a curing energy lower that a curing energy usually utilized in A-stage curing processes. In still further aspects, the energy used in the first step of the B-stage curing process can be about ½ of the energy used in the A-stage curing process. In certain aspects, the first step of the B-stage curing process can produce a partially cured ink layer. In other aspects, the tie layer can be applied to this partially cured ink layer, and then a second step of the B-stage curing process is performed. In still further aspects, the tie layer can be applied to the partially cured ink layer followed by application of the wear layer, and only then the second step of the B-stage curing process is performed.

In various aspects, the tie layers described herein can comprise an adhesive composition. It is understood that the adhesive composition can comprise any desired adhesives. In a further aspect, the chemical adhesive can comprise at least one of: ethylene-acrylic acid-maleic anhydride (EAA-MAH), ethylene-methyl acrylate-maleic anhydride (EMA-MAH), ethylene-vinyl acetate (EVA), ethylene-acrylic acid-maleic anhydride (EAA-MAH), ethylene-methyl acrylate (EMA), ethylene-vinyl acetate (EVA), polyurethane (PUR), polyurethane dispersion (PUD), or acrylic adhesive. In a still further aspect, the adhesive can comprise a film or powder. In a yet further aspect, the adhesive is heat activated, UV cured, or eBeam cured. In some aspects, the adhesive composition comprises EAA-MAH. In yet other aspects, the adhesive composition comprises ethylene-vinyl acetate (EVA). In still further aspects, the adhesive composition comprises ethylene-acrylic acid (EAA). In still other aspects, the adhesive composition comprises polyurethane dispersions (PUD). In some other aspects, adhesives sold as Dupont Bynel E418 can be utilized.

In various aspects, the disclosed layers of the resilient floors covering can be constructed or otherwise formed by conventional methods and/or processes. Similarly, it is contemplated that the respective layers can be connected to each other in sequential or non-sequential order. Unless otherwise stated, no particular order of operative steps for product formation is required to practice the present invention. It is further contemplated that any conventional means of forming or joining layers of a layered construct such as the exemplified resilient floor covering can be used, to include, without limitation, extrusion, lamination, combinations of the same, and the like. Finally, it is contemplated that after the layers of the flooring covering are joined together, the resulting sheet of flooring composite can be cut into desired shapes and desired sizes, for example, and without limitation, into a roll goods, plank or tile shapes that can be conventionally or non-conventionally sized and/or shaped.

As disclosed herein, in one aspect, the materials that are selected for the respective layers of the flooring covering can be readily recycled. It is contemplated that one or more of the respective layers of the can comprise recycled post-consumer and/or post-industrial materials, such as, for example and without limitation, recycled post-industrial carpet and/or post-consumer carpet polymeric materials. In this aspect, the formed floor covering can minimize use of virgin materials and advantageously allow for the use of previously recycled materials in forming the recyclable flooring covering of the present invention.

In certain aspects, a first backing layer can be extruded thereon or otherwise connected to the second surface of the substrate and a fiberglass mat layer is imbedded therein the second surface of the first backing layer. Of course, prior to this step, an optionally an additional tie layer can be connected to the second surface of substrate layer if required.

In certain aspects, the applying of the tie layer can be done by any methods known in the art. In some aspects, the tie layer can be extruded, casted, deposited using slot dies, or hotmelts, or any combination thereof. In some aspects, the tie layer can be melted and cast through a sheet die, and then a desired amount of the material is applied to the ink layer, or any other desirable layer. After coating the film with the extrusion process, the material can be quenched or set with a typical cooling process, such as cooling rolls, prior to the coated film being re-rolled. In a still further aspect, the tie layer can be in the form of a liquid hot melt or cold melt adhesive, and can be added onto the ink layer, the wear layer, or any other layer by a spray or roll-coating process. In a yet further aspect, and as would be recognized by one of skill in the art, the tie layer can be applied to the ink layer or any other layer while in liquid form by spray equipment or roll-coating equipment, and then dried with heat, air, or other curing means prior to re-rolling the film.

In a further aspect, a second backing layer can be extruded thereon or otherwise connected to the bottom surface of the fiberglass mat layer to fully encapsulate the fiberglass layer. Referring to FIG. 2, in one example, the respective first backing layer and second backing layer can comprise the backing composition described herein. Next, if desired, a secondary backing, such as the exemplified non-woven polypropylene secondary backing, can be extruded thereon or otherwise connected to the bottom surface of the second backing layer.

In some aspects, initially the ink layer applied to the first surface of the substrate layer. Sequentially, the backing portion comprising any disclosed layers is applied to the second surface of the substrate layer that defines the second surface of the decorative portion. Next, sequentially, the tie layer is applied to the ink layer and the wear layer is applied to the first surface of the tie layer. In some aspects, the step of applying the tie layer to the ink layer and then applying the wear layer to the tie layer can be done, for example, sequentially in a co-extrusion process.

In some aspects, initially the ink layer applied to the first surface of the substrate layer. Sequentially, the backing portion comprising any disclosed layers is applied to the second surface of the substrate layer that defines the second surface of the decorative portion. Next, sequentially, the tie layer is applied to the wear layer and the decorative portion is applied to the second surface of the tie layer.

In a further aspect, each layer or portion of the resilient flooring can be manufactured or laminated together using traditional manufacturing methods, such as, but not limited to, a static press. As would be recognized by one of skill in the art, the method used for lamination in a static press would include the use of heat and pressure between metal plates for a specified amount of time to press together each of the desired layers described herein. For example, and without limitation, a combination of the wear layer, tic layer(s), ink, substrate layer, optional additional tie layer(s), and one or more backing layers, would be stacked in the desired order and placed inside the static press, then laminated together with the aforementioned combination of heat and pressure. In a still further aspect, one or more of the metal plates used to press the layers or portions of the resilient flooring together may include an emboss texture to transfer to the top or bottom surface of the resilient flooring. In a yet further aspect, this emboss texture could include a design desired for the wear layer that is inherent in the final product.

Figure 3:
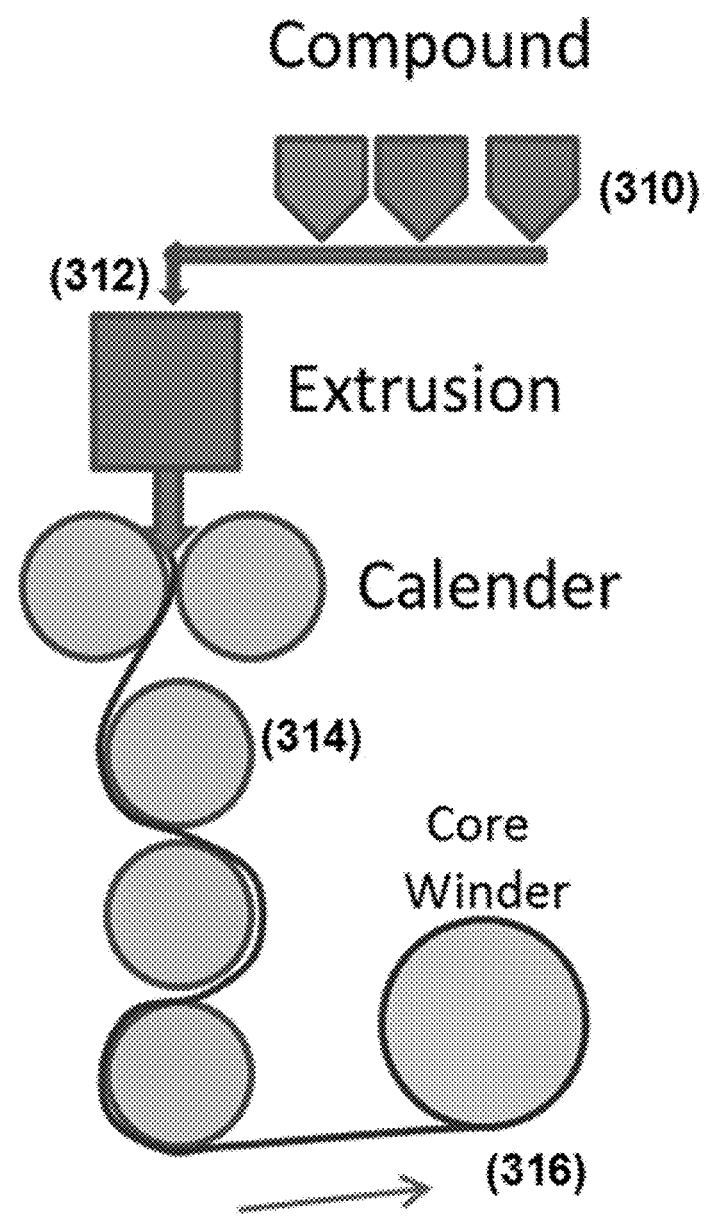
FIG. 3 depicts an exemplary manufacturing methodology for producing a resilient floor covering according to aspects of the present invention.

In some aspects, each individual layer or portion of the resilient floor covering can be independently manufactured prior to the production of the resilient floor covering. For example, and referring now to the particular example illustrated in FIG. 3, an exemplary system for producing backing layer is shown. Here, the backing composition, which optionally can include a tackifier, recycled content, and/or chopped fiberglass is compounded (310), extruded (312), and rolled through a calendar (314) to form backing layer. The formed backing layer is then wound by the core winder (316) into rolls, which can later be used to produce the disclosed resilient floor coverings.

Figure 4:
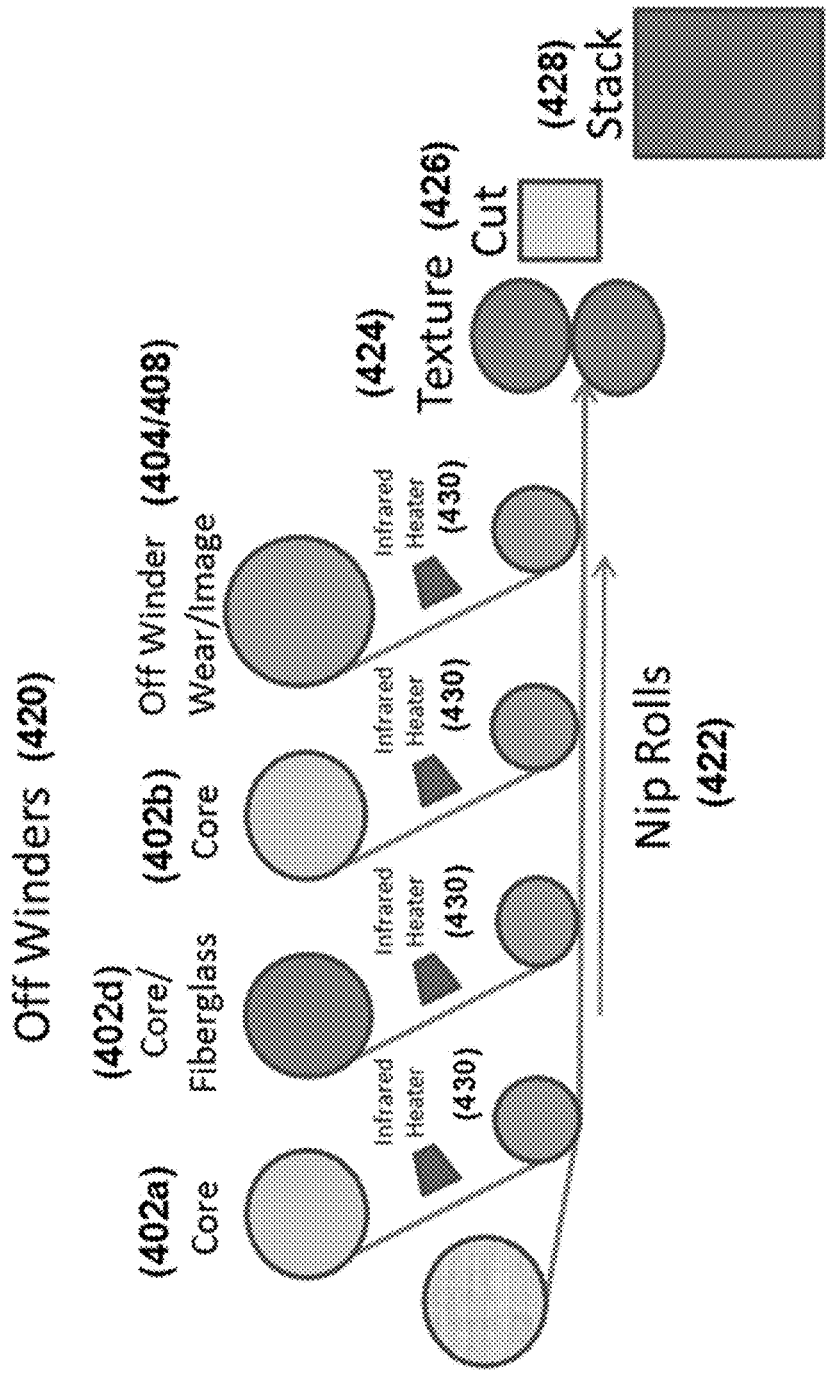
FIG. 4 depicts an exemplary manufacturing methodology for producing a resilient floor covering according to aspects of the present invention.

In another aspect, and referring now to the particular example illustrated in FIG. 4, an exemplary system for producing the floor covering is shown. In a further aspect, the resilient floor covering can be prepared by a nip roll methods, for example, by applying the layers off rolls using winders (420). The formed backing layer is rolled (402a) onto a top surface of a nip roll (422). Optionally, a secondary backing layer (402b) can first be unrolled onto the belt, next sequentially if the secondary backing layer is used. In the embodiments in which the backing layer of the backing portion comprises a first backing layer and a second backing layer, a fiberglass mat layer (402d) can be rolled thereon the first backing layer and, sequentially, the second backing layer is rolled thereon the fiberglass mat layer. In this embodiment, the secondary backing layer defines the bottom surface of the backing portion and the first backing layer defines the top surface of the backing portion. Here, if a secondary backing layer is used, it is contemplated that the first and second backing layers are configured to substantially overlie the secondary backing layer. Infrared heaters (430) can be used in the process. Further, the decorative portion (404) and a wear layer (408) are rolled to form a textured (424) article that is then cut (426) to a desired size and stacked (428).

Figure 5:
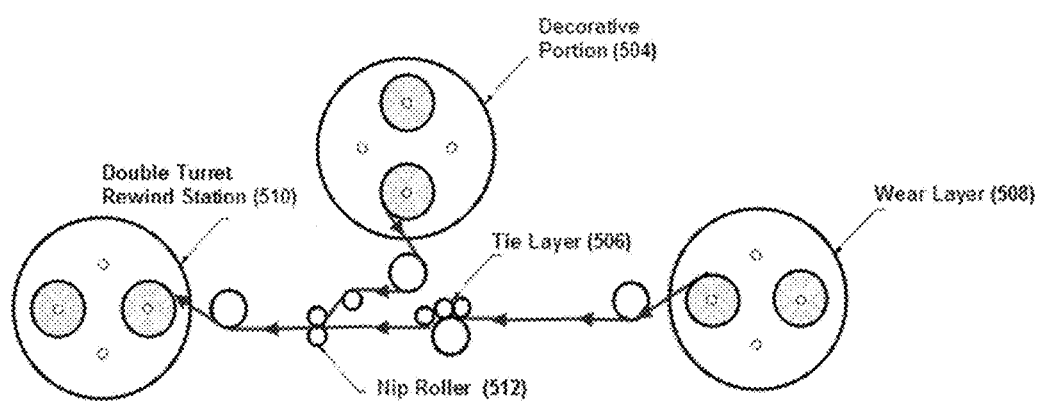
FIG. 5 depicts an exemplary manufacturing methodology for producing a resilient floor covering according to aspects of the present invention.

In another aspect, and referring now to the particular example illustrated in FIG. 5, an exemplary system for adhering the decorative portion and the wear layer is shown. In one aspect, the wear layer (508) is unrolled onto a top surface of a nip roll, the tie layer (506), for example, a hot melt, or any other tie layer described herein is applied onto the wear layer. In this aspect, the decorative portion (504) comprising the ink layer is unrolled on the second surface of the tie layer. It is understood that in this aspect, the decorative portion can be applied alone, or can be previously combined with the backing portion. Sequentially, all three layers are laminated by passing through NIP roller (512) and rolled at a rewind station (510).

Figure 6:
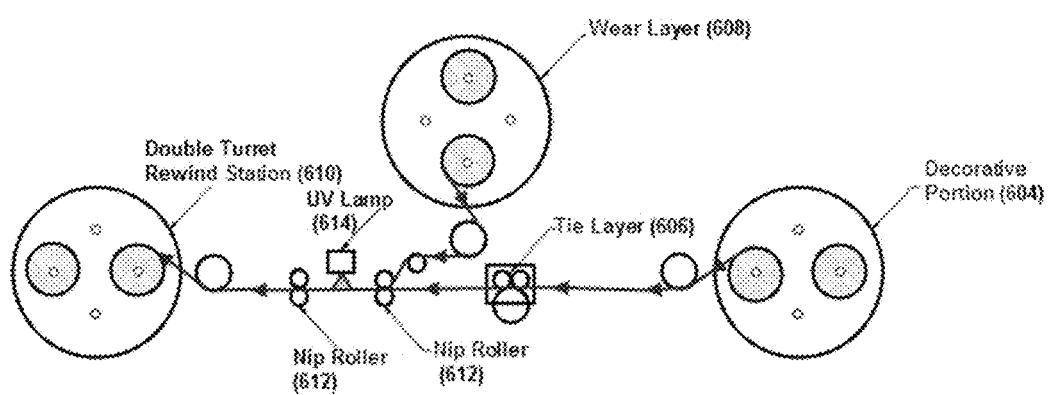
FIG. 6 depicts an exemplary manufacturing methodology for producing a resilient floor covering according to aspects of the present invention.

In still further aspects, and referring now to the particular example illustrated in FIG. 6, an exemplary system for adhering the decorative portion and the wear layer is shown. In one aspect, the decorative portion comprising the ink layer (604) is unrolled onto a top surface of a nip roll, the tie layer (606), for example, a UV-cured adhesive, or any adhesive described herein, is applied onto the first surface of the decorative portion comprising the ink layer. In this aspect, the wear layer (608) is unrolled on the first surface of the tie layer. Sequentially all three layers are laminated by passing through NIP roller (612), cured by UV-light (614) and rolled at a rewind station (610).

In a next step, a decorative portion and a wear layer are first attached to each other by a tie layer described herein, and then are rolled thereon the backing portion and the flooring product is optionally passed therebetween a pair of opposed rollers to emboss the flooring product as desired prior to the flooring product being cut to a desired size and/or shape, and stacked. In a further aspect, each rolled layer can be optionally operatively heated using an infrared heater or dryer.

In a further aspect, the edge profile can have any desired edge profile design, for example and without limitation, a click-lock or tongue and groove connection system. In some aspects, the edge profile for connecting can have a more complex geometry. In a further aspect, the edge connection system can substantially restrict movement from side-to-side and vertically. In a still further aspect, the connection seams, once installed, are all uniform and flat at each connection point. In a yet further aspect, the edge profile can be different for all four edges.

In a further aspect, the edge profile can be formed by any desired means, for example, by milling, routing or tenoner process, or the like.

As one of skill in the art will recognize, the backing composition formulation can, in various aspects, influence the stability of the backing portion, for example, the relative amounts and types of filler and polyolefin elastomer used in the formulation. In a further aspect, additives, such as tackifiers, foaming agents, process aids, and plasticizers can also influence the stability of the formulation. In a still further aspect, an unstable backing portion can have weak edge connection profiles that can be easily damaged. In a yet further aspect, smoothness and uniformity of the edge connection profile can be influenced by the backing composition formulation. In an even further aspect, the wear layer and scratch layer can delaminate, melt, or flake off during the edge profile process or when the flooring is installed.

In various aspects, the resilient floor coverings of the present invention advantageously do not exhibit flaking, melting, or delamination during the edge profiling process. In a further aspect, the disclosed resilient floor coverings do not exhibit brittle or weak edge connection profiles.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for.

EXAMPLES

Example 1

In this Example, a resilient floor covering sample was prepared using a conventional backing portion. The decorative portion was prepared by digitally printing Durst 30 DM ink (a UV-cured ink) on a 3 mil thickness whitened PVC film used a substrate layer. The ink was cured according to the known in the art UV curing methods. A 1 mil tie layer of Technomelt® PUR 475A hot melt (a hot melt polyurethane adhesive available from Henkel) was deposited on a surface of the cured ink and a clear 12 mil thickness PVC film was then deposited as a wear layer on the underlying tie layer. A UV cured scratch layer was further applied to the wear layer. The sample was tested for pull resistance. It was determined that the wear layer exhibited pull values greater than about 3 pounds as determined by ASTM 3936 with 1" by 6" strip pulled at a rate of 2"/min for a pull distance of 2".

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A resilient floor covering comprising:
   a backing portion having a first surface and a second surface, wherein the second surface of the backing portion is opposed to the first surface of the backing portion;
   a decorative portion having a first surface and a second surface, wherein the second surface of the decorative portion is opposed to the first surface of the decorative portion,
      wherein the decorative portion overlies the backing portion such that at least a portion of the second surface of the decorative portion faces at least a portion of the first surface of the backing portion,
      wherein the decorative portion comprises a substrate layer and an UV cured ink layer that overlies at least a portion of the substrate layer;
   a tie layer comprising an adhesive composition,
      wherein the adhesive composition comprises hot melt polyurethane, and
      wherein the tie layer substantially overlies the decorative portion such that at least a portion of the tie layer is disposed on the first surface of the decorative portion;
   a wear layer substantially overlying the tie layer such that at least a portion of the wear layer adheres to at least a portion of the tie layer; and
   a scratch layer disposed above the wear layer, wherein the scratch layer is a UV cured layer.

2. The resilient floor covering of claim 1, wherein the substrate layer comprises oriented polypropylene (OPP), polyolefin (PO), woven polyethylene (PE), nonwoven PE, woven polypropylene (PP), nonwoven PP, woven PET, nonwoven PET, woven nylon, nonwoven nylon, paper, foil, foiled oriented polypropylene, a heat stabilized biaxially-oriented PET (BoPET), amorphous PET (aPET), recycled PET (rPET), polyethylene terephthalate glycol-modified (PETG), cyclic olefin copolymer (COC), cyclic olefin polymer (COP), polyvinylidene fluoride (PVDF), a polylactic acid (PLA) copolymer, nylon, cellulose acetate, poly (methyl methacrylate) (PMMA), thermoplastic polyurethane (TPU), a thermoplastic elastomer (TPS), polycarbonate, polyethylene (PE), or a copolymer thereof.

3. The resilient floor covering of claim 1, wherein the substrate layer is a whitened substrate layer.

4. The resilient floor covering of claim 1, wherein the substrate layer is a film.

5. The resilient floor covering of claim 1, wherein the substrate layer has a thickness of 1 mil to 20 mil.

6. The resilient floor covering of claim 1, wherein the backing portion comprises a single backing layer.

7. The resilient floor covering of claim 1, wherein the backing portion comprises a plurality of backing layers.

8. The resilient floor covering of claim 6, wherein the backing portion is an extruded backing portion.

9. The resilient floor covering of claim 1, further comprising a balancing layer disposed on at least a portion of the second surface of the backing portion.

10. The resilient floor covering of claim 1, wherein the backing portion comprises a polyester, a polyamide, a polyolefin, a polyurethane, or any combination thereof.

11. The resilient floor covering of claim 1, wherein the backing portion comprises a low-density polyethylene (LDPE), linear low-density polyethylene (LLDPE), ethylene methacrylate (EMA), ethylene vinyl acetate (EVA), polyethylene-polypropylene (PE-PP) rubber, a thermoplastic elastomer (TPE) (TPEs), conventional a thermoplastic olefin (TPO), an alpha-olefin polyethylene copolymer, polyethylene terephthalate (PET), ethylene butyl acrylate (EBA), ethylene-octene copolymer, high density polyethylene (HDPE), and heterogeneously branched ultra-low density polyethylene (ULDPE), or any combination thereof.

12. The resilient floor covering of claim 1, wherein the wear layer can exhibit a pull value greater than 3 pounds as determined by ASTM 3936 with 1" by 6" strip pulled at a rate of 2"/min for a pull distance of 2.

13. The resilient floor covering of claim 1, wherein the wear layer comprises at least one of polyethylene terephthalate (PET), polyurethane, polypropylene, polytrimethylene terephthalate (PTT), nylon 6, nylon 6,6, polyvinyl chloride (PVC), surlyn resin, heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), a polylactic acid (PLA) copolymer, nylon, cellulose acetate, poly (methyl methacrylate) (PMMA), thermoplastic polyurethane (TPU), a thermoplastic elastomer (TPE), polycarbonate, polyethylene (PE), high density polyethylene (HDPE), or low density polyethylene (LDPE), or combinations thereof.

14. A floor covering comprising:
   a backing portion having a first surface and a second surface, wherein the second surface of the backing portion is opposed to the first surface of the backing portion;
   a decorative portion having a first surface and a second surface,
      wherein the second surface of the decorative portion is opposed to the first surface of the decorative portion,
      wherein the decorative portion is disposed above the backing portion such that the second surface of the decorative portion faces the first surface of the backing portion,
      wherein the decorative portion comprises a substrate layer and an UV cured ink layer that overlies at least a portion of the substrate layer;
   a tie layer comprising an adhesive composition,
      wherein the adhesive composition comprises a polyurethane-based adhesive; and wherein the tie layer substantially overlies the decorative portion such that at least a portion of the tie layer adheres to the decorative portion; and a wear layer substantially overlying the tie layer such that at least a portion of the wear layer adheres to at least a portion of the tie layer; and a scratch layer disposed above the wear layer, the scratch layer being a UV-cured layer, wherein the wear layer exhibits a pull value greater than about 5 pounds as determined by ASTM 3936 with a 1-inch by 6-inch strip pulled at a rate of 2 inch/min for a pull distance of 2 inches.

15. The floor covering of claim 14, further comprising a balancing layer disposed on the second surface of the backing portion.

16. The floor covering of claim 14, further comprising:
an additional substrate layer disposed between the tie layer and the decorative portion, wherein the additional substrate layer is a primer coating layer; and
another primer coating layer disposed between the wear layer and the scratch layer, wherein the scratch layer is adhered to the wear layer by the other primer coating layer.

17. The floor covering of claim 14, further comprising an additional substrate layer disposed between the tie layer and the decorative portion, wherein the additional substrate layer is a primer coating layer.

18. The floor covering of claim 14, wherein the substrate layer comprises oriented polypropylene (OPP), polyolefin (PO), woven polyethylene (PE), nonwoven PE, woven polypropylene (PP), nonwoven PP, woven PET, nonwoven PET, woven nylon, nonwoven nylon, paper, foil, foiled oriented polypropylene, a heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), a polylactic acid (PLA) copolymer, nylon, cellulose acetate, poly (methyl methacrylate) (PMMA), thermoplastic polyurethane (TPU), a thermoplastic elastomer (TPS), polycarbonate, polyethylene (PE), or a copolymer thereof.

19. The floor covering of claim 14, wherein the backing portion comprises a polyester, a polyamide, a polyolefin, a polyurethane, or any combination thereof.

20. The floor covering of claim 14, wherein the polyurethane-based adhesive is a UV-curable adhesive, and the tie layer is a UV-cured layer.

21. The floor covering of claim 14, wherein the decorative layer further comprises a primer coating layer that is disposed over the UV cured ink layer and defines the first surface of the decorative portion.

22. The floor covering of claim 14, wherein the backing portion comprises a single backing layer.

23. The floor covering of claim 14, wherein the backing portion comprises a plurality of backing layers, wherein at least one of the plurality of backing layers is a polyurethane based layer and at least another one of the plurality of backing layers is a polypropylene based layer, and wherein one of the at least one of the plurality of backing layers that is a polyurethane based layer defines the second surface of the backing layer.

24. The floor covering of claim 14, wherein the substrate layer is a film.

25. The floor covering of claim 14, wherein edges of the floor covering comprise an edge profile formed therein, wherein the edge profile comprises a tongue and groove system or a locking system that is configured to substantially restrict at least one of a horizontal or vertical movement when connected to another resilient floor covering.

26. The floor covering of claim 14, further comprising flat edges.

27. The floor covering of claim 14, wherein the backing portion comprises at least one layer, and wherein the backing portion is extruded.

28. A resilient floor covering comprising:
a backing portion having a first surface and a second surface, wherein the second surface of the backing portion is opposed to the first surface of the backing portion;
a decorative portion having a first surface and a second surface, wherein the second surface of the decorative portion is opposed to the first surface of the decorative portion,
wherein the decorative portion is disposed above the backing portion such that at least a portion of the second surface of the decorative portion faces the backing portion,
wherein the decorative portion comprises a UV cured ink layer that is coupled to the backing portion;
a UV-cured tie layer comprising an adhesive composition,
wherein the adhesive composition comprises a polymer adhesive, and
wherein the tie layer substantially overlies the decorative portion such that at least a portion of the tie layer is disposed over the decorative portion;
a wear layer substantially overlying the tie layer such that at least a portion of the wear layer is disposed over at least a portion of the tie layer; and
a scratch layer disposed above the wear layer,
wherein the scratch layer is UV cured, and
wherein the wear layer exhibits a pull value greater than about 5 pounds as determined by ASTM 3936 with a 1-inch by 6-inch strip pulled at a rate of 2 inch/min for a pull distance of 2 inches.

29. The resilient floor covering of claim 28, wherein the backing portion comprises a single backing layer.

30. The resilient floor covering of claim 28, wherein the backing portion comprises a plurality of layers.

31. The resilient floor covering of claim 28, wherein the backing portion comprises a polyester, a polyamide, a polyolefin, a polyurethane, or any combination thereof.

32. The resilient floor covering of claim 28, wherein at least one layer of the plurality of backing layers comprises a polyester, a polyamide, a polyolefin, a polyurethane, or any combination thereof.

33. The resilient floor covering of claim 28, wherein the decorative portion further comprises a substrate layer, and wherein the UV cured ink layer overlies the substrate layer.

34. The resilient floor covering of claim 33, wherein the substrate layer is a primer layer.

35. The resilient floor covering of claim 28, wherein the wear layer comprises at least one of polyethylene terephthalate (PET), polyurethane, polypropylene, polytrimethylene terephthalate (PTT), nylon 6, nylon 6,6, polyvinyl chloride (PVC), surlyn resin, heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), a polylactic acid (PLA) copolymer, nylon, cellulose acetate, poly (methyl methacrylate) (PMMA), thermoplastic polyurethane (TPU), a thermoplastic elastomer (TPE), polycarbonate, polyethylene (PE), high density polyethylene (HDPE), or low density polyethylene (LDPE), or a combination thereof.

36. The resilient floor covering of claim 28, wherein the adhesive composition further comprises at least one of a photo initiator or an additive that increase flexibility.

37. The resilient floor covering of claim 28, wherein the polymer adhesive comprises a UV curable resin.

38. The resilient floor covering of claim 37, wherein the UV curable resin comprises at least one of a polyurethane acrylate-based main-chain polymer, a polyisoprene acrylate-based main chain polymer, a polybutadiene acrylate-based main-chain polymer, or a monomeric (meth) acrylate, or a combination thereof.

39. The resilient floor covering of claim 28, wherein the wear layer exhibits a pull value greater than about 7 pounds as determined by ASTM 3936 with a 1-inch by 6-inch strip pulled at a rate of 2 inch/min for a pull distance of 2 inches.

40. The resilient floor covering of claim 28, wherein the backing portion comprises a low-density polyethylene (LDPE), linear low-density polyethylene (LLDPE), ethylene methacrylate (EMA), ethylene vinyl acetate (EVA), polyethylene-polypropylene (PE-PP) rubber, a thermoplastic elastomer (TPE), a thermoplastic olefin (TPO), an alpha-olefin polyethylene copolymer, polyethylene terephthalate (PET), ethylene butyl acrylate (EBA), ethylene-octene copolymer, high density polyethylene (HDPE), and heterogeneously branched ultra-low density polyethylene (ULDPE), or any combination thereof.

41. The resilient floor covering of claim 28, wherein the substrate layer comprises oriented polypropylene (OPP), polyolefin (PO), woven polyethylene (PE), nonwoven PE, woven polypropylene (PP), nonwoven PP, woven PET, nonwoven PET, polyethylene (PE), polypropylene (PP), polyethylene terephthalate (PET), woven nylon, nonwoven nylon, paper, foil, foiled oriented polypropylene, a heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), a polylactic acid (PLA) copolymer, nylon, cellulose acetate, poly (methyl methacrylate) (PMMA), thermoplastic polyurethane (TPU), a thermoplastic elastomer (TPS), polycarbonate, polyethylene (PE), or a copolymer thereof.

42. The resilient floor covering of claim 33, wherein the substrate layer is a film.

43. The resilient floor covering of claim 28, further comprising edges with edge profile formed therein, wherein the edge profile comprises a tongue and groove system or a locking system that is configured to substantially restrict at least one of a horizontal or vertical movement when connected to another resilient floor covering.

44. The resilient floor covering of claim 28, further comprising flat edges.

45. A resilient floor covering comprising:
   a backing portion having a first surface and a second surface, wherein the second surface of the backing portion is opposed to the first surface of the backing portion;
   a decorative portion having a first surface and a second surface, wherein the second surface of the decorative portion is opposed to the first surface of the decorative portion,
      wherein the decorative portion overlies the backing portion,
      wherein the decorative portion comprises a substrate layer and an UV cured ink layer that overlies at least a portion of the substrate layer;
   a tie layer comprising a UV cured adhesive composition,
      wherein the adhesive composition comprises a polymer adhesive, and
      wherein the tie layer substantially overlies the decorative portion such that at least a portion of the tie layer is disposed above the decorative portion;
   a wear surface substantially overlying the tie layer such that at least a portion of the wear surface is disposed over a portion of the tie layer; and
   a scratch layer disposed over the wear surface,
      wherein the scratch layer is UV cured,
      wherein the resilient floor covering exhibits a static load indentation depth in the range of about 0 inches to about 0.09 inches measured based on ASTM F970 under conditions of: 250 lb. static load for 24 hours, recover of 24 hours, and 1.125 inch outside diameter probe,
      wherein the wear layer exhibits a pull value greater than about 5 pounds as determined by ASTM 3936 with a 1-inch by 6-inch strip pulled at a rate of 2 inch/min for a pull distance of 2.

46. The resilient floor covering of claim 45, wherein the backing portion comprises a single backing layer.

47. The resilient floor covering of claim 45, wherein the backing portion comprises a plurality of layers, and wherein the plurality of layers is extruded.

48. The resilient floor covering of claim 45, wherein the backing portion comprises a polyester, a polyamide, a polyolefin, a polyurethane, or any combination thereof.

49. The resilient floor covering of claim 47, wherein at least one layer of the plurality of layers comprises a polyester, a polyamide, a polyolefin, a polyurethane, or any combination thereof.

50. The resilient floor covering of claim 45, wherein the wear layer comprises at least one of polyethylene terephthalate (PET), polyurethane, polypropylene, polytrimethylene terephthalate (PTT), nylon 6, nylon 6,6, polyvinyl chloride (PVC), surlyn resin, heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), a polylactic acid (PLA) copolymer, nylon, cellulose acetate, poly (methyl methacrylate) (PMMA), thermoplastic polyurethane (TPU), a thermoplastic elastomer (TPE), polycarbonate, polyethylene (PE), high density polyethylene (HDPE), or low density polyethylene (LDPE), or a combination thereof.

51. The resilient floor covering of claim 45, wherein the decorative layer further comprises a primer coating that is disposed over the UV cured ink layer and defines the first surface of the decorative portion.

52. The resilient floor covering of claim 45, wherein the adhesive composition further comprises at least one of a photo initiator or an additive that increase flexibility.

53. The resilient floor covering of claim 45, wherein the polymer adhesive comprises a UV curable resin.

54. The resilient floor covering of claim 53, wherein the UV curable resin comprises at least one of a polyurethane acrylate-based main-chain, a polyisoprene acrylate-based main chain polymer, a polybutadiene acrylate-based main-chain polymer, or a monomeric (meth) acrylate, or a combination thereof.

55. The resilient floor covering of claim 45, wherein the polymer adhesive is a polyurethane-based resin that is UV curable.

56. The resilient floor covering of claim 45, wherein the backing portion comprises a low-density polyethylene (LDPE), linear low-density polyethylene (LLDPE), ethylene methacrylate (EMA), ethylene vinyl acetate (EVA), polyethylene-polypropylene (PE-PP) rubber, a thermoplastic elastomer (TPE), a thermoplastic olefin (TPO), an alpha-olefin polyethylene co-polymer, polyethylene terephthalate (PET), ethylene butyl acrylate (EBA), ethylene-octene copolymer, high density polyethylene (HDPE), and heterogeneously branched ultra-low density polyethylene (ULDPE), or any combination thereof.

57. The resilient floor covering of claim 45, wherein the substrate layer comprises oriented polypropylene (OPP), polyolefin (PO), woven polyethylene (PE), nonwoven PE, woven polypropylene (PP), nonwoven PP, woven PET, nonwoven PET, polyethylene (PE), polypropylene (PP), polyethylene terephthalate (PET), woven nylon, nonwoven nylon, paper, foil, foiled oriented polypropylene, a heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), a polylactic acid (PLA) copolymer, nylon, cellulose acetate, poly (methyl methacrylate) (PMMA), thermoplastic polyurethane (TPU), a thermoplastic elastomer (TPS), polycarbonate, polyethylene (PE), or a copolymer thereof.

58. The resilient floor covering of claim 45, wherein the substrate layer is a film.

59. The resilient floor covering of claim 45, further comprising edges with edge profile formed therein, wherein the edge profile comprises a tongue and groove system or a locking system that is configured to substantially restrict at least one of a horizontal or vertical movement when connected to another resilient floor covering.

60. The resilient floor covering of claim 45, further comprising flat edges.

61. The resilient floor covering of claim 45, wherein the pull value is determined by ASTM 3936 with a 1-inch by 6-inch strip pulled at a rate of 2 inch/min for a pull distance of 2 inches.

* * * * *